(12) United States Patent
Nakamura

(10) Patent No.: US 10,386,957 B2
(45) Date of Patent: Aug. 20, 2019

(54) CONDUCTIVE FILM AND TOUCH PANEL SENSOR PROVIDED WITH SAME

(71) Applicant: FUJIFILM Corporation, Tokyo (JP)

(72) Inventor: Hiroshige Nakamura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

(21) Appl. No.: 15/496,656

(22) Filed: Apr. 25, 2017

(65) Prior Publication Data

US 2017/0228090 A1 Aug. 10, 2017

Related U.S. Application Data

(63) Continuation of application No. PCT/JP2015/074438, filed on Aug. 28, 2015.

(30) Foreign Application Priority Data

Nov. 21, 2014 (JP) ................................. 2014-236924

(51) Int. Cl.
| G06F 3/041 | (2006.01) |
| G06F 3/044 | (2006.01) |
| G06F 3/0354 | (2013.01) |

(52) U.S. Cl.
CPC ........ G06F 3/0416 (2013.01); G06F 3/03545 (2013.01); G06F 3/044 (2013.01);
(Continued)

(58) Field of Classification Search
CPC .... G06F 3/0416; G06F 3/03545; G06F 3/044; G06F 2203/04103; G06F 2203/04112
See application file for complete search history.

(56) References Cited

U.S. PATENT DOCUMENTS

| 2014/0083751 | A1* | 3/2014 | Oh ........................ G06F 3/044 174/257 |
| 2015/0160764 | A1* | 6/2015 | Bae ....................... G06F 3/045 345/174 |
| 2015/0363024 | A1* | 12/2015 | Hayashi ................. G06F 3/044 345/174 |

FOREIGN PATENT DOCUMENTS

| JP | 5390018 B2 | 1/2014 |
| JP | 2014-63468 A | 4/2014 |

OTHER PUBLICATIONS

International Search Report, issued in PCT/JP2015/074438, PCT/ISA/210, dated Oct. 6, 2015.
(Continued)

*Primary Examiner* — Ryan A Lubit
(74) *Attorney, Agent, or Firm* — Birch, Stewart, Kolasch & Birch, LLP

(57) ABSTRACT

The conductive film is configured such that in a case in which a parameter Ca of a first-overlapped-portion in which a thin metal wire constituting a first-electrode and a thin metal wire constituting a second-electrode are superimposed in plan view is represented by Equation (1) of Ca=(A−wa*wb)/d, while setting an area of the first-overlapped-portion to A ($\mu m^2$), line widths of the respective thin metal wires constituting the first-electrode and the second-electrode to wa and wb ($\mu m$), and a distance between the first-electrode and the second-electrode in a thickness direction of a substrate to d ($\mu m$), in a 5 mm×5 mm quadrangular region that is set to include a crossing region in which the first-electrode and the second-electrode cross each other in a conductive region, the parameter Ca of 90% or more of the first-overlapped-portions included in the region is 1.0 or less.

20 Claims, 13 Drawing Sheets

(52) U.S. Cl.
CPC .............. *G06F 2203/04103* (2013.01); *G06F 2203/04112* (2013.01)

(56) References Cited

OTHER PUBLICATIONS

Written Opinion of the International Searching Authority, issued in PCT/JP2015/074438, PCT/ISA/237, dated Oct. 6, 2015.
International Preliminary Report on Patentability and English translation of Written Opinion of the International Searching Authority dated May 23, 2017, issued in PCT/JP2015/074438 (Forms PCT/IB/373 and PCT/ISA/237).

* cited by examiner

CONDUCTIVE FILM AND TOUCH PANEL SENSOR PROVIDED WITH SAME

CROSS-REFERENCE TO RELATED APPLICATIONS

This application is a Continuation of PCT International Application No. PCT/JP2015/074438 filed on Aug. 28, 2015, which claims priority under 35 U.S.C § 119(a) to Japanese Patent Application No. 2014-236924 filed on Nov. 21, 2014. Each of the above application(s) is hereby expressly incorporated by reference, in its entirety, into the present application.

BACKGROUND OF THE INVENTION

1. Field of the Invention

The present invention relates to a conductive film and a touch panel sensor provided with the same. Specifically, the present invention relates to a conductive film in which at least one of two electrode patterns constituted by combining a plurality of cells formed of a plurality of thin metal wires is a random pattern constituted of cells with irregularity, and a touch panel sensor provided with the same.

2. Description of the Related Art

Conventionally, a touch panel sensor of an electrostatic capacitive type or the like, which formed of a conductive film including a detection electrode having a two-layer structure having a strip-like electrode pattern constituted of a transparent conductive material such as indium tin oxide (ITO) or the like, or a mesh-like electrode pattern formed of a thin metal wire of silver, copper, or the like, is used in touch panel displays or the like (for example, refer to JP5390018B and JP2014-63468A).

JP5390018B discloses an electrostatic capacitive type input device that is formed by using a strip-like electrode pattern formed of ITO and is provided with an electrostatic capacitive type touch panel sensor having a sensor portion including a detection electrode having a two-layer structure in which a plurality of lower electrode patterns and a plurality of upper electrode patterns, which are formed at intervals in a height direction, are arranged to cross each other in plan view, in which an operation surface to be touched with a finger or the like is a curved surface, for example, convex curved surface or concave curved surface.

In the technique disclosed in JP5390018B, as a distance between the operation surface and the sensor portion which varies according to a touch position of a finger or the like increases, at the crossing position of the respective lower electrode pattern and upper electrode pattern, the superimposed area of the both patterns decreases. Thus, uniformity in sensor sensitivity can be simply and appropriately improved over the entire curved operation surface.

On the other hand, JP2014-63468A discloses an electrostatic capacitive type touch panel including a detection electrode having a two-layer structure on which mesh-like first electrode pattern and second electrode pattern constituted of thin metal wires of silver, copper, or the like are formed on both sides of an interposing layer, such as a transparent resin substrate, while interposing the interposing layer therebetween.

In the technique disclosed in JP2014-63468A, by forming the width of the side of the crossing region of each electrode pattern to be narrow and preventing the width of the crossing region from becoming wider than the width of regions other than crossing region in each electrode pattern of the first electrode pattern and the second electrode pattern, a user can be prevented from recognizing the crossing region.

SUMMARY OF THE INVENTION

However, since the electrostatic capacitive type touch panel sensor reads out changes in electrostatic capacitance by the presence or absence of a finger or the like, as parasitic capacitance between the electrodes increases, changes in electrostatic capacitance caused by touch are relatively easily buried in noise. Thus, the sensitivity decreases. Particularly, when the in-plane electrostatic capacitance value of the touch panel sensor is not uniform, there is a problem in that the sensitivity further decreases.

Therefore, in the technique disclosed in JP5390018B, by respectively expanding or contracting the line widths of the strip-like upper and lower electrode patterns and changing the superimposed area of the both patterns at the crossing position of the both electrode patterns according to the distance between the operation surface and the sensor portion, which varies since the operation surface is a convex curved surface or concave curved surface, in-plane variations of changes in electrostatic capacitance in which the distance between the operation surface and the sensor portion varies according to a touch position of a finger or the like are suppressed and the in-plane stability of the sensor sensitivity is obtained.

However, the technique disclosed in JP5390018B is applied to a typical touch panel sensor in which the operation surface is parallel with the sensor portion and the distance between the operation surface and the sensor portion is constant, and thus in the technique disclosed in JP5390018B, it is not possible to solve a problem of in-plane variations in changes in electrostatic capacitance of a sensor portion of a typical touch panel sensor, that is, a problem of in-plane stability of sensor sensitivity.

In addition, in the technique disclosed in JP5390018B, the line widths of the strip-like upper and lower electrode patterns constituted of ITO or the like change according to the distance between the operation surface and the sensor portion, but the upper and lower electrode patterns are regular patterns with regularity in which the respective center lines thereof are parallel with each other and perpendicular to each other.

Therefore, in the technique disclosed in JP5390018B, there is a problem in that a problem of in-plane variations in changes in electrostatic capacitance of a sensor portion of a touch panel sensor in which at least one of the upper and lower electrode patterns constituted of thin metal wires is a random pattern with irregularity, that is, a problem of in-plane stability of sensor sensitivity, cannot be solved.

In the technique disclosed in JP2014-63468A, the width of the side of the thin metal wire in the crossing region of the respective first electrode pattern and second electrode pattern constituted of thin metal wires is formed to be narrow so that the recognition of the crossing region can be improved. However, since the crossing portion in which the first electrode pattern and the second electrode pattern cross each other in plan view with the interposing layer interposed therebetween, that is, the superimposed region of the thin metal wires, is not set as a target region, a problem of in-plane variations in changes in electrostatic capacitance of a touch panel sensor caused by the superimposed region of the thin metal wires of such a crossing portion, that is, a problem of in-plane stability of sensor sensitivity, cannot be solved.

In addition, the electrostatic capacitive type sensor using a thin metal wire has a large amount of electrostatic capacitance in the crossing portion in which the thin metal wires constituting the both electrode patterns of the first electrode and the second electrode are superimposed. However, as in technique disclosed in JP2014-63468A, in the touch panel sensor having the first electrode and the second electrode having a rhombic regular electrode pattern, a so-called regular electrode pattern, typically, the thin metal wires constituting the first electrode and the second electrode cross each other at a predetermined angle, and in-plane variations in the area of the crossing portion do not occur. Therefore, a problem of in-plane stability of sensor sensitivity does not arise in the touch panel sensor constituted by a regular electrode pattern.

However, unlike the technique disclosed in JP2014-63468A, when electrodes are constituted by using random cells with irregularity such as polygonal cells having different sizes, in the case in which the thin metal wire constituting the first electrode pattern and the thin metal wire constituting the second electrode pattern cross each other at a shallow angle, particularly, at an extremely shallow angle, for example, at an angle of 10 degrees or less as shown in FIG. 14, the case in which the thin metal wires are entirely or partially superimposed as shown by surrounding of a circle C2 in FIG. 15, or the like, the area of the superimposed region or the crossing portion may extremely increase. In this case, a place in which the electrostatic capacitance is locally large is formed and there is a problem in in-plane stability as a touch panel sensor.

An object of the present invention is to solve the problems of the related art and to provide a conductive film, capable of, even when an electrostatic capacitive type touch panel sensor is configured such that at least one of first electrode pattern or second electrode pattern respectively constituted by combining cells formed of a plurality of thin metal wires is a random pattern formed of cells with irregularity, obtaining or securing in-plane stability as a touch panel sensor, as a result, attaining excellent responsiveness as a touch panel sensor, and maintaining in-plane stability to the same degree as in the case of using a regular pattern, while suppressing the occurrence of moire, and an electrostatic capacitive type touch panel sensor provided with the same.

In order to achieve the above object, according to a first aspect of the present invention, there is provided a conductive film comprising: a substrate which is a transparent insulator; and a first electrode having a first electrode pattern and a second electrode having a second electrode pattern, which are respectively arranged to face the substrate and to cross or superimpose each other, in which the first electrode and the second electrode are respectively constituted of thin metal wires and are respectively electrically connected to each other, the first electrode pattern and the second electrode pattern are respectively constituted by combining cells formed of the thin metal wires, the cells constituting at least one of the first electrode pattern or the second electrode pattern are provided with irregularity, and in a case in which a parameter Ca of a first overlapped portion in which the thin metal wire constituting the first electrode and the thin metal wire constituting the second electrode are superimposed in plan view is represented by the following Equation (1), while setting an area of the first overlapped portion to A, line widths of the respective thin metal wires constituting the first electrode and the second electrode to wa and wb, and a distance between the first electrode and the second electrode in a thickness direction of the substrate to d, in a 5 mm×5 mm quadrangular region that is set to include a crossing region in which the first electrode and the second electrode cross each other in a conductive region formed by the first electrode, the second electrode, and the substrate on which these electrodes are arranged, the parameter Ca of 90% or more first overlapped portions among all of the first overlapped portions included in the quadrangular region is 1.0 or less.

$$Ca=(A-wa*wb)/d \qquad (1)$$

where the area A of the first overlapped portion is expressed by $\mu m^2$, the line widths wa and wb of the thin metal wires are expressed by $\mu m$, and the distance d between the first electrode and the second electrode is expressed by $\mu m$.

Here, it is preferable that the first electrode and the second electrode are respectively formed on both surfaces of the substrate. It is preferable to form the electrodes on both surfaces of one substrate since the conductive film is formed using one substrate and the total thickness of the conductive film can be made thin.

In this case, it is preferable that the first electrode pattern of the first electrode and the second electrode pattern of the second electrode are respectively arranged to face both sides of the substrate while interposing the substrate therebetween and to cross each other, and the first overlapped portion is formed by superimposing the thin metal wire constituting the first electrode and the thin metal wire constituting the second electrode in plan view with the substrate interposed therebetween.

It is preferable that the conductive film further comprises a second substrate which is different from the substrate and is a transparent insulator, in which the first electrode is formed on one surface of the substrate, the second electrode is formed on one surface of the second substrate, the substrate and the second substrate are caused to adhere to each other with an adhesive, and the first overlapped portion is formed by superimposing the thin metal wire constituting the first electrode and the thin metal wire constituting the second electrode in plan view with the substrate interposed therebetween.

It is preferable that the first electrode and the second electrode are respectively formed on one side of the substrate with an insulating layer interposed therebetween, the first electrode pattern of the first electrode and the second electrode pattern of the second electrode are respectively arranged to face both sides of the insulating layer while interposing the insulating layer therebetween and to cross each other, and the first overlapped portion is formed by superimposing the thin metal wire constituting the first electrode and the thin metal wire constituting the second electrode in plan view with the insulating layer interposed therebetween.

It is preferable that the first overlapped portion includes a crossing portion in which the thin metal wire constituting the first electrode and the thin metal wire constituting the second electrode cross each other in plan view with the substrate or the insulating layer interposed therebetween, and a portion in which the two thin metal wires on both sides are superimposed in a width direction thereof.

In order to achieve the above object, according to a second aspect of the present invention, there is provided a conductive film comprising: a substrate which is a transparent insulator; and a first electrode having a first electrode pattern and a second electrode having a second electrode pattern, which are respectively arranged to face the substrate and to cross or superimpose each other, in which the first electrode and the second electrode are respectively constituted of thin metal wires and are respectively electrically connected to each other, the first electrode pattern and the second electrode pattern are respectively constituted by combining cells formed of the thin metal wires, the cells constituting at least one of the first electrode pattern or the second electrode pattern are provided with irregularity, and when both side regions formed along a center line in a range of four times of a width W of the thin metal wire from the center line in a width direction of the thin metal wires are set to vicinity regions, in a case in which a parameter Cb of a second overlapped portion in which the vicinity region of the thin metal wire constituting the first electrode and the vicinity region of the thin metal wire constituting the second electrode are superimposed in plan view is represented by the following Equation (2), while setting an area of the second overlapped portion to B, line widths of the thin metal wires respectively constituting the first electrode and the second electrode to wa and wb, and a distance between the first electrode and the second electrode in a thickness direction of the substrate to d, in a 5 mm×5 mm quadrangular region that is set to include a crossing region in which the first electrode and the second electrode cross each other in a conductive region formed by the first electrode, the second electrode, and the substrate on which these electrodes are arranged, the parameter Cb of 90% or more second overlapped portions among all of the second overlapped portions included in the quadrangular region is 0.5 or less.

$$Cb=(B/16-wa*wb)/d \qquad (2)$$

where the area B of the second overlapped portion is expressed by $\mu m^2$, the line widths wa and wb of the thin metal wires are expressed by µm, and the distance d between the first electrode and the second electrode is expressed by µm.

Here, it is preferable that the first electrode and the second electrode are respectively formed on both surfaces of the substrate, the first electrode pattern of the first electrode and the second electrode pattern of the second electrode are respectively arranged to face both sides of the substrate while interposing the substrate therebetween and to cross each other, and the second overlapped portion is formed by superimposing the vicinity region of the thin metal wire constituting the first electrode and the vicinity region of the thin metal wire constituting the second electrode in plan view with the substrate interposed therebetween.

It is preferable that the conductive film further comprises a second substrate which is different from the substrate and is a transparent insulator, in which the first electrode is formed on one surface of the substrate, the second electrode is formed on one surface of the second substrate, the substrate and the second substrate are caused to adhere to each other with an adhesive, and the second overlapped portion is formed by superimposing the vicinity region of the thin metal wire constituting the first electrode and the vicinity region of the thin metal wire constituting the second electrode in plan view with the substrate interposed therebetween.

It is preferable that the first electrode and the second electrode are respectively formed on one side of the substrate with an insulating layer interposed therebetween, the first electrode pattern of the first electrode and the second electrode pattern of the second electrode are respectively arranged to face both sides of the insulating layer while interposing the insulating layer therebetween and to cross each other, and the second overlapped portion is formed by superimposing the vicinity region of the thin metal wire constituting the first electrode and the vicinity region of the thin metal wire constituting the second electrode in plan view with the insulating layer interposed therebetween.

It is preferable that the second overlapped portion includes a crossing portion in which the vicinity region of the thin metal wire constituting the first electrode and the vicinity region of the thin metal wire constituting the second electrode cross each other in plan view with the substrate or the insulating layer interposed therebetween and a portion in which the two vicinity regions of the thin metal wires on both sides are superimposed in a width direction thereof.

It is preferable that the distance d between the first electrode and the second electrode is 100 µm or less.

It is preferable that the line widths wa and wb of the thin metal wires are 0.5 µm to 10 µm.

It is preferable that the line widths wa and wb of the thin metal wires are equal to each other.

In order to achieve the object, according to a third aspect of the present invention, there is provided a touch panel sensor comprising: the conductive film according to the first aspect; and a detection control portion that detects a touch position or approach position from a main surface side of the conductive film.

Here, it is preferable that the conductive film may be touched with a stylus pen from the main surface side.

As described above, according to the present invention, it is possible to provide a conductive film capable of, even when at least one of first electrode pattern or second electrode pattern respectively constituted by cells formed of plurality of thin metal wires is a random pattern formed of cells with irregularity, obtaining or securing in-plane stability as a touch panel sensor, as a result, attaining excellent responsiveness as a touch panel sensor, and maintaining in-plane stability to the same degree as in the case of using a regular pattern, while suppressing the occurrence of moire, and an electrostatic capacitive type touch panel sensor provided with the same.

DESCRIPTION OF THE PREFERRED EMBODIMENTS

Hereinafter, a conductive film according to the present invention and a touch panel sensor provided with the same will be described in detail with reference to preferable embodiments shown in the accompanying drawings.

In the following description, a conductive film for a touch panel sensor will be described as a representative example of the conductive film according to the present invention. However, the present invention is not limited to this example. Any conductive film may be used as long as the conductive film is a conductive film in which at least one of both electrode patterns of first electrode or second electrode to be arranged on both sides of a substrate which is a transparent insulator (transparent insulating substrate) is an electrode pattern having polygonal cells (opening portions) with irregularity. Examples of the conductive film according to the present invention include conductive films arranged on display panels of display devices such as liquid crystal display (LCD), plasma display panel (PDP), organic electroluminescence (EL) diode (OLED: Organic Light Emitting Diode) or organic EL display (OELD: Organic Electro-Luminescence Display) using organic electro-luminescence (organic EL) (OEL), inorganic EL display, and electronic paper, and used as touch panel sensors.

(Electrostatic Capacitive Type Touch Panel Sensor)

Figure 1:
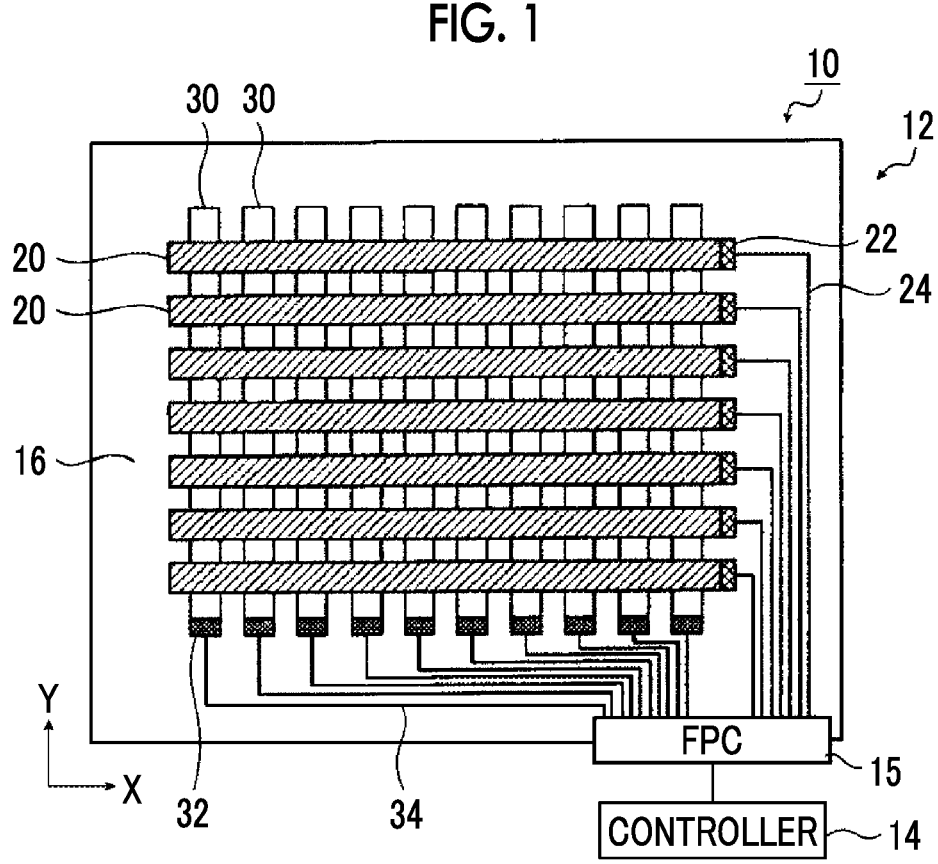
FIG. 1 is a plan view schematically showing an example of a touch panel sensor having a conductive film according to an embodiment of the present invention.
Figure 2:
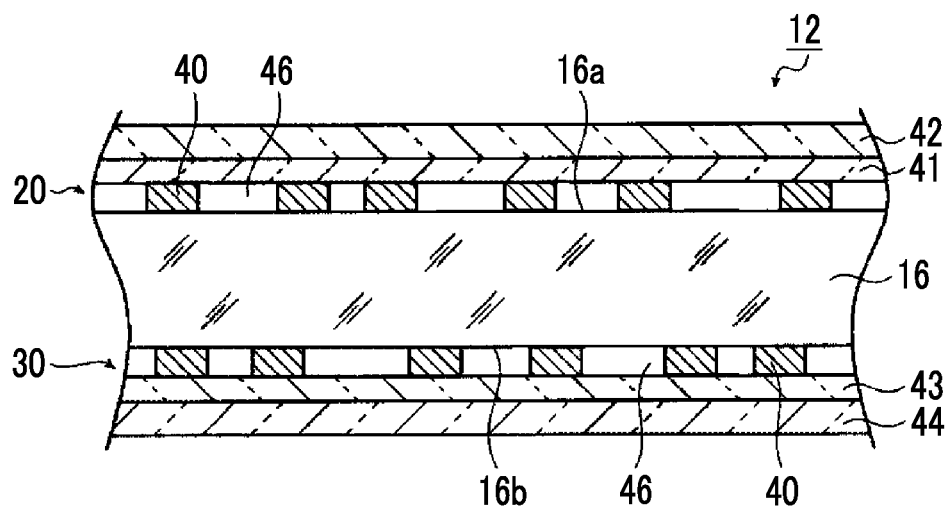
FIG. 2 is a schematic cross-sectional view showing an example of the conductive film to be used in the touch panel sensor shown in FIG. 1.
Figure 3:
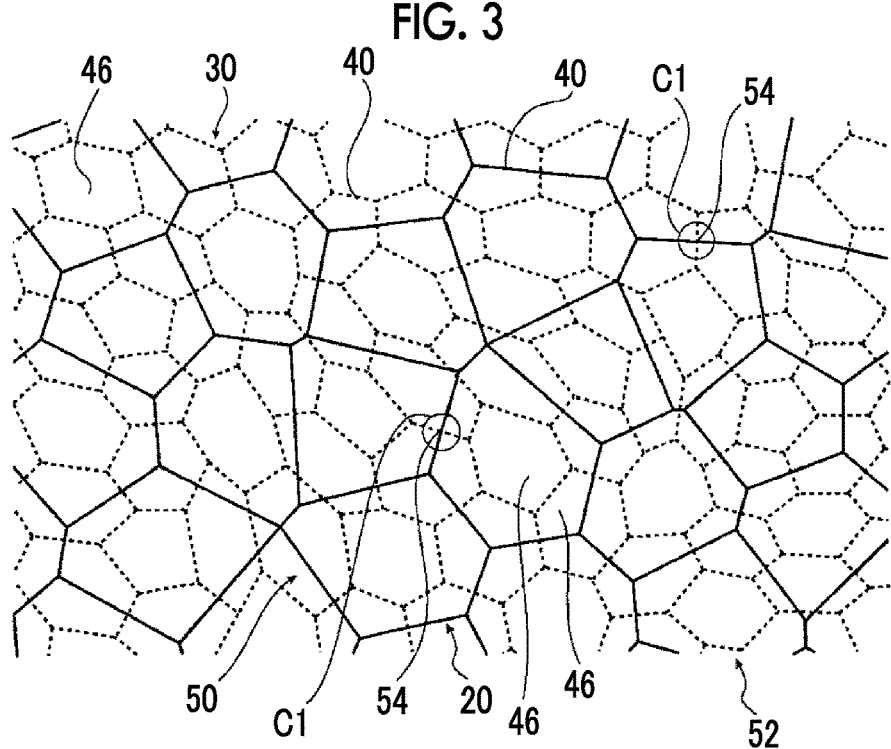
FIG. 3 is a plan view schematically showing an example of a state in which two random electrode patterns of the conductive film shown in FIG. 2 are superimposed.

FIG. 1 is a plan view schematically showing an example of a touch panel sensor having a conductive film according to a first embodiment of the present invention, FIG. 2 is a schematic cross-sectional view showing an example of the conductive film according to the first embodiment of the present invention to be used in the touch panel sensor shown in FIG. 1, and FIG. 3 is a plan view showing an example of a random electrode pattern of the conductive film shown in FIG. 2.

A touch panel sensor 10 shown in FIG. 1 is arranged on the display screen of a display device (not shown) (on the side close to an operator) and is a sensor for detecting a position of an external conductor such as a human finger by utilizing a change in electrostatic capacitance that is generated when the external conductor such as a human finger touches or approaches the display device, as described above. Therefore, the touch panel sensor 10 is transparent to recognize an image to be displayed on the display panel. In addition, the display device is not particularly limited as long as a predetermined image including a moving image or the like can be displayed on the screen.

In the touch panel sensor 10 of the present invention, the conductive film may be touched with a stylus pen from the main surface side, as the external conductor, instead of using a human finger or the like.

The touch panel sensor 10 has a conductive film 12 of the present invention constituting a sensor portion, a controller 14, and a Flexible Printed Circuits (FPC) 15 which connects the conductive film 12 and the controller 14.

The configuration of the sensor portion in the conductive film 12 of the touch panel sensor 10 is not particularly limited, but the touch panel sensor typically has detection electrodes having a two-layer structure (for example, a plurality of first electrodes 20 extending in an X direction in FIG. 1 and a plurality of second electrodes 30 extending in a Y direction in FIG. 1) and calculates and specifies the coordinate of the position of an object such as a finger by the controller 14 formed of an IC control circuit or the like by detecting a change in electrostatic capacitance between the detection electrodes having a two-layer structure that the object such as a finger touches or approaches. The controller 14 is an external device of the conductive film 12 and constitutes a detection control portion that detects a touch position or approach position from a main surface side (operation side, viewing side) of the conductive film 12. For example, a known device used for position detection of the electrostatic capacitive type touch panel sensor can be used.

As shown in FIG. 1, on a substrate 16 of the conductive film 12, the plurality of first electrodes 20 extending in the X direction are provided at intervals in the Y direction perpendicular to the X direction and in the example shown in the drawing, seven first electrodes 20 are arranged. Meanwhile, the plurality of second electrodes 30 extending in the Y direction provided at intervals in the X direction and in the example shown in the drawing, ten second electrodes 30 are arranged. In this manner, the plurality of first electrodes 20 and the plurality of second electrodes 30 arranged to be perpendicular to each other form a region in which touch or approach (hereinafter, represented by touch) of an object such as a finger (hereinafter, represented by a finger) can be detected.

Although not shown in FIG. 1, the detection region includes the plurality of first electrodes 20, the plurality of second electrodes 30, and the substrate 16 (refer to FIG. 2) interposed therebetween. The first electrode 20 is arranged on the surface of the substrate 16 on the viewing side and the second electrode 30 is arranged on the surface of the substrate 16 on the opposite side to the viewing side, that is, on the surface opposite to the surface on which the first electrode 20 is formed. That is, the plurality of first electrodes 20 extending in the X direction and the plurality of second electrodes 30 extending in the Y direction cross one another with the substrate 16 interposed therebetween.

In the example shown in the drawing, the detection region is formed by the seven first electrodes 20 and the ten second electrodes 30. However, the number of the first electrodes 20 and the second electrodes 30 forming the detection region is not particularly limited and may be appropriately set according to required performance of detection accuracy or detection sensitivity.

The plurality of first electrodes 20 each have a first terminal portion 22 at its end and are electrically connected to a plurality of first lead-out wirings 24 by the first terminal portions 22, respectively. The plurality of first lead-out wirings 24 are electrically connected to the FPC 15. The FPC 15 is electrically connected to the controller 14.

The first electrode 20 has a role of detecting an input position of a finger of a user approaching the detection region in the X direction and has a function of detecting a change in electrostatic capacitance by the touch of the finger.

The plurality of second electrodes 30 each have a second terminal portion 32 at its end and are electrically connected to a plurality of second lead-out wirings 34 by the second terminal portions 32, respectively. The plurality of second lead-out wirings 34 are electrically connected to the FPC 15.

The second electrode 30 has a role of detecting an input position of a finger of a user approaching the detection region in the Y direction and has a function of detecting a change in electrostatic capacitance by the touch of the finger.

The plurality of first lead-out wirings 24 and the plurality of second lead-out wirings 34 are formed in a region other than the detection region of the conductive film 12.

In the example shown in the drawing, both the first electrode 20 and the second electrode 30 are schematically shown in a strip shape but the detailed configuration thereof will be described in detail later.

FIG. 2 is a partial cross section view showing a region in which the first electrode 20 and the second electrode 30 are superimposed to be perpendicular to each other in the conductive film 12 of the touch panel sensor 10 shown in FIG. 1.

In this region, as shown in FIG. 2, the conductive film 12 has the substrate 16 which is a transparent insulator (transparent insulating substrate), the first electrode 20 formed of a plurality of thin metal wires 40 on a surface 16a of the substrate 16 (the surface on the main surface side), a protective layer 42 provided with an adhesive layer 41 so as to cover the surface (the surface on the main surface side) of the first electrode 20, the second electrode 30 formed of the plurality of thin metal wires 40 on a rear surface 16b of the substrate 16 (the surface opposite to the main surface), and a protective layer 44 provided with an adhesive layer 43 so as to cover the surface (the surface opposite to the main surface) of the second electrode 30.

As described above, the first electrode 20 and the second electrode 30 are respectively arranged on both sides of the substrate 16. Both the first electrode 20 and the second 30 electrode are formed of the thin metal wires 40 and function as detection electrodes which detect a touch position of a finger in the touch panel sensor 10.

By forming the first electrode 20 and the second electrode 30 on both surfaces of one substrate 16 respectively, even when the substrate 16 shrinks, a shift in positional relationship between the first electrode 20 and the second electrode 30 can be reduced.

The substrate 16 supports the first electrode 20 and the second electrode 30 and is preferably constituted of a transparent electrical insulating material. The substrate 16 is preferably transparent and has flexibility. For example, as the substrate 16, a plastic film, a plastic plate, a glass plate, or the like can be used. For example, the plastic film and the plastic plate can be constituted of polyesters such as polyethylene terephthalate (PET), and polyethylene naphthalate (PEN), polyolefins such as polyethylene (PE), polypropylene (PP), polystyrene, ethylene-vinyl acetate copolymers (EVA), cycloolefin polymer (COP), and cycloolefin copolymer (COC), vinyl-based resins, in addition to polycarbonate (PC), polyamide, polyimide, acrylic resin, and triacetyl cellulose (TAC). It is preferable that the substrate 16 is constituted of polyethylene terephthalate (PET), polyolefins such as cycloolefin polymer (COP), and cycloolefin copolymer (COC) from the viewpoint of light transmittance, heat shrinkage, workability, and the like.

As the substrate 16, a treated support which has been subjected to at least one treatment of atmospheric pressure plasma treatment, corona discharge treatment, or ultraviolet irradiation treatment can be used. By performing the above-described treatment, a hydrophilic group such as OH group is introduced into the surface of the treated support and adhesiveness between the first electrode 20 and the second electrode 30 is further improved. Among the above-described treatments, from the viewpoint of further improving adhesiveness between the first electrode 20 and the second electrode 30, atmospheric pressure plasma treatment is preferable.

As shown in FIG. 2, the first electrode 20 and the second electrode 30 are respectively formed of the plurality of thin metal wires 40 and are respectively electrically connected to each other. As shown in plan view when viewed from the main surface side of the conductive film 12 in FIG. 3, each detection electrode is constituted by combining a plurality of cells (opening portions) 46 formed of the plurality of thin metal wires 40 and has a first electrode pattern 50 and a second electrode pattern 52 in which the shape of the cell 46 is polygonal. In the electrode crossing region (point) in which the first electrode 20 and the second electrode 30 are superimposed to cross (be perpendicular to) each other, the thin metal wire 40 constituting the first electrode pattern 50 and the thin metal wire 40 constituting the second electrode pattern 52 are superimposed to cross each other in plan view with the substrate 16 interposed therebetween so as to form a crossing portion, as shown in FIG. 3, or are superimposed to be at least partially overlapped so as to form an overlapped portion.

In the present invention, the first electrode 20 and the second electrode 30 are defined as electrodes not including a dummy electrode which is not electrically connected.

Here, at least one of the first electrode pattern 50 of the first electrode 20 or the second electrode pattern 52 of the second electrode 30 is a random pattern in which irregularity is imparted to at least one of the angle of the apex, the length of the side, the number of sides, the polygonal pitch, or the like of the polygon of the cell 46. As the parameter which gives randomness increases, the thin metal wire constituting the first electrode pattern and the thin metal wire constituting the second electrode pattern are likely to be unintentionally superimposed in a large area and thus the necessity of applying the designs of the present invention increases.

Both the first electrode pattern 50 indicated by a solid line in FIG. 3 and the second electrode pattern 52 indicated by a broken line in FIG. 3 are random patterns constituted by combining the plurality of polygonal cells 46 and are random electrode patterns in which irregularity is imparted to any of the angle, the length of the side, the arrangement pitch, and the shape of the polygonal cell 46.

As described above, in the case in which random patterns are used as the first electrode pattern 50 and the second electrode pattern 52, the visibility of the thin metal wires 40 of each of the electrode pattern 52 and the visibility of the synthesized electrode pattern of each of the electrode pattern 52, specifically, the visibility of moire occurring due to interference between the synthesized electrode pattern and the black matrix (BM) or the pixel arrangement pattern of RGB pixels of the display device, can be improved.

The shape of the cells 46 formed of the thin metal wires 40 of the first electrode pattern 50 and the second electrode pattern 52 is hexagonal in most cases but the present invention is not limited thereto. For example, geometric configuration formed by combining triangles such as equilateral triangle, isosceles triangle, and right triangle, quadrangles such as square, rectangle, rhomboid, parallelogram and trapezoid, (equilateral) n-gons such as (equilateral) hexagon and (equilateral) octagon, star, and the like may be used.

The term "polygon" includes not only a geometrically perfect polygon but also a "substantial polygon" in which the above perfect polygon is slightly changed. As examples of the slight change, addition of a point element and a line element that are small compared with the shape of the cell 46 formed of the thin metal wire 40, a partial defect of each side of the thin metal wire 40 that forms the cell 46, curving the constitutional side, and the like can be mentioned.

The thin metal wire 40 is not particularly limited and is formed of, for example, ITO, Au, Ag, or Cu. In addition, the thin metal wire 40 may be constituted by further incorporating a binder into ITO, Au, Ag, or Cu. The thin metal wire 40 including a binder allows easy bending working and thus bending resistance is improved. Therefore, the thin metal wire 40 is preferably constituted of a conductor including a binder. As the binder, a binder used for the wiring of the conductive film can be appropriately used and for example, binders described in JP2013-149236A can be used.

A method of forming the thin metal wire 40 of the first electrode 20 and the second electrode 30 is not particularly limited. For example, the thin metal wire can be formed by exposing a photosensitive material having an emulsion layer containing a photosensitive silver halide and developing the photosensitive layer. In addition, the first electrode 20 and the second electrode 30 can be formed by forming metal foils on the substrate 16, and printing a resist on each of the metal foils into a pattern or exposing and developing a resist applied to the entire surface to form a pattern, and etching the metal in opening portions. In addition to the above method, the first electrode 20 and the second electrode 30 can be formed by a method of printing a paste including fine particles of the material constituting the above-described conductor and plating the paste with a metal, a method of using an ink jet method using an ink including fine particles of the material constituting the above-described conductor, and the like.

For example, the first terminal portion 22, the first lead-out wiring 24, the second terminal portion 32, and the second lead-out wiring 34 can be formed simultaneously or separately by the above-described method of forming the thin metal wire 40.

The line widths of each thin metal wire 40 in both the first electrode 20 and the second electrode 30 may be the same or different from each other. In any case, the line width of the thin metal wire 40 is not particularly limited and for example, the line width may be 0.3 µm to 30 µm, preferably 0.5 µm to 10 µm, more preferably 1.0 µm to 7 µm, and most preferably 1.0 µm to 5 µm. When the line width is within the above range, a first electrode 20 and a second electrode 30 having low resistance can be relatively easily formed.

In the case in which the thin metal wire 40 is applied to peripheral wirings (for example, the first lead-out wirings 24 and the second lead-out wirings 34) in a conductive film for a touch panel, the line width of the thin metal wire 40 is preferably 500 µm or less, more preferably 50 µm or less, and particularly preferably 30 µm or less. When line width is within the above range, a touch panel electrode having low resistance can be relatively easily formed.

In addition, in the case in which the thin metal wire 40 is applied to peripheral wirings in a conductive film for a touch panel, a mesh electrode pattern can be formed by the peripheral wirings in the conductive film for a touch panel. In this case, the line width is not particularly limited and is preferably 30 µm or less, more preferably 15 µm or less, more preferably 10 µm or less, particularly preferably 9 µm or less, and most preferably 7 µm or less. The line width is preferably 0.5 µm or more and more preferably 1.0 µm or more. When the line width is within the above range, peripheral wirings having low resistance can be relatively easily formed. It is preferable that the peripheral wirings in the conductive film for a touch panel are formed into a mesh pattern, since in a step of performing irradiation with pulse light from a xenon flash lamp, it is possible to enhance uniformity in lowering of resistance by the irradiation of the detection electrode (conductive layer), the terminal portion, and the peripheral wirings (lead-out wirings), and also, in the case in which a transparent adhesive layer is attached, the peel strength of the detection electrode, the terminal portion, and the peripheral wirings can be maintained to be constant so that a small in-plane distribution can be achieved.

The thickness of the thin metal wire 40 is not particularly limited and is preferably 0.01 µm to 200 µm, more preferably 30 µm or less, even more preferably 20 µm or less, particularly preferably 0.01 µm to 9 µm, and most preferably 0.05 µm to 5 µm. When the thickness is within the above-described range, a detection electrode, a terminal portion, and peripheral wirings having low resistance and excellent durability can be relatively easily formed.

The protective layer 42 is provided to protect the first electrode 20 and the protective layer 44 is provided to protect the second electrode 30. The protective layers 42 and 44 are not particularly limited in the configuration thereof. For example, glass, polycarbonate (PC), polyethylene terephthalate (PET), acrylic resin (PMMA), or the like can be used.

The adhesive layers 41 and 43 are provided to fix the respective protective layers 42 and 44 onto the substrate 16. For any of these adhesive layers, for example, an optically transparent adhesive (OCA) and an optically transparent resin (OCR) such as UV curable resin can be used.

In the present invention, as shown in FIG. 3, the thin metal wire 40 constituting the first electrode 20 and the thin metal wire 40 constituting the second electrode 30 form crossing portion in which the thin metal wires cross each other in plan view with the transparent insulating substrate 16 interposing therebetween in a large number of points, that is, a large number of overlapped portions in which the thin metal wires 40 are superimposed.

Figure 4:
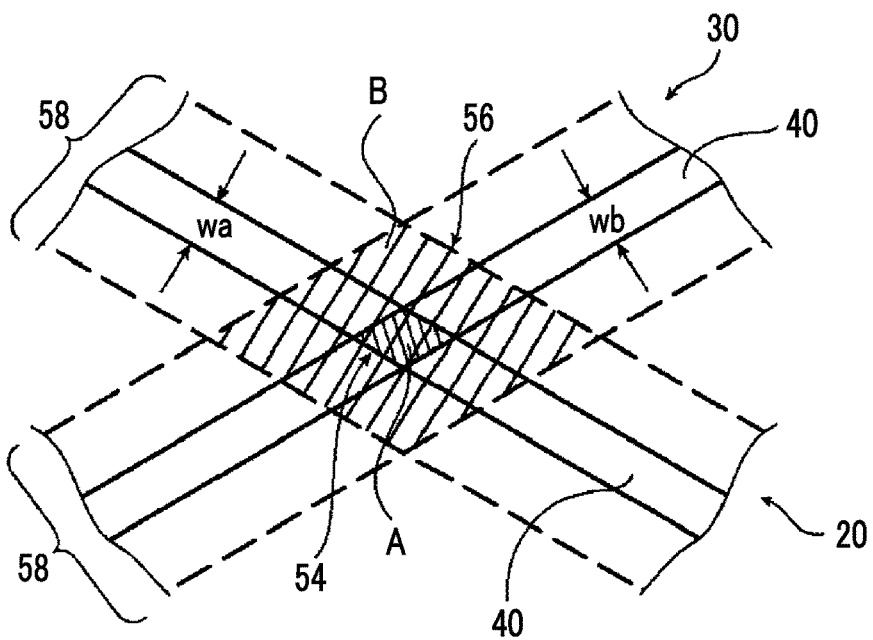
FIG. 4 is a view illustrating a crossing portion of thin metal wires respectively constituting first electrode pattern and second electrode pattern of the conductive film of the present invention in plan view and a superimposed region of vicinity regions in plan view.

FIG. 4 shows a region including a crossing portion indicated by a circle C1 in FIG. 3 in an enlarged manner.

As shown in FIG. 4, the thin metal wire 40 constituting the first electrode 20 and the thin metal wire 40 constituting the second electrode 30 are superimposed to cross at a predetermined angle, in the example shown in the drawing, at 60°, to form a crossing portion 54 as an overlapped portion.

However, in the case in which the area of the crossing portion 54 is set to A ($\mu m^2$), when the area A becomes larger, the crossing portion 54 has a large electrostatic capacitance. As shown in FIG. 3, there are a large number of the crossing portions 54 and the intersecting angles are different. Thus, when there is a crossing portion 54 having an extremely large area A among the large number of crossing portions 54, at the place where the crossing portion 54 is present, a place where the electrostatic capacitance is locally large is formed and the in-plane stability as the touch panel sensor 10 collapses to cause a problem, which is described as above.

Therefore, when the area of the crossing portion 54 is set to A ($\mu m^2$), the line width of the thin metal wire 40 of the first electrode 20 is set to wa ($\mu m$), the line width of the thin metal wire 40 of the second electrode 30 is set to wb ($\mu m$), and a distance between the first electrode 20 and the second electrode 30 in the thickness direction of the substrate 16 is set to d ($\mu m$) in the present invention, in a conductive region formed by the first electrode 20, the second electrode 30, and the substrate 16 interposed therebetween, that is, in a detection region, in an arbitrary 5 mm×5 mm quadrangular region that is set to include the crossing region (point) in which the first electrode 20 and the second electrode 30 are superimposed to cross (be perpendicular to) each other, that is, in any of 5 mm×5 mm quadrangular evaluation target regions, it is required that a parameter Ca represented by the following Equation (1) in 90% or more crossing portions 54 among all of the crossing portions 54 included in the target region is 1.0 or less (Ca≤1.0).

$$Ca=(A-wa*wb)/d \qquad (1)$$

In other words, it is required that the percentage of the crossing portions 54 in which the parameter Ca represented by the above Equation (1) is more than 1.0, which are included in an arbitrary set target region of the detection region, that is, in any of the set target regions, is not more than 10%.

As described above, in the present invention, since the line width wa of the thin metal wire 40 of the first electrode 20 and the line width wb of the thin metal wire 40 of the second electrode 30 may be different from each other or the same, in the case in which the both line widths wa and wb are equal, the widths can be represented by wa=wb=w. In this case, the above Equation (1) can be represented by the following Equation (1A).

$$Ca=(A-w^2)/d \qquad (1A)$$

For example, in the case of the synthesized random electrode patterns of the both first electrode pattern 50 and second electrode pattern 52 constituted of the random polygonal cells 46 with irregularity as shown in FIG. 3, when the line widths wa and wb of the thin metal wires 40 are both 5 $\mu m$ (wa=wb=w=5 $\mu m$) and the distance d between the thin metal wires 40 of the first electrode pattern 50 and second electrode pattern 52 is 100 $\mu m$ (d=100 $\mu m$), the conditions are satisfied in which the area A of the crossing portion (first overlapped portion) 54 indicated by the circle frame C1 in the drawing is 43.7 $\mu m^2$ (A=43.7 $\mu m^2$), the parameter Ca is 0.187, and the parameter Ca is 1.0 or less (Ca≤1.0).

Figure 13:
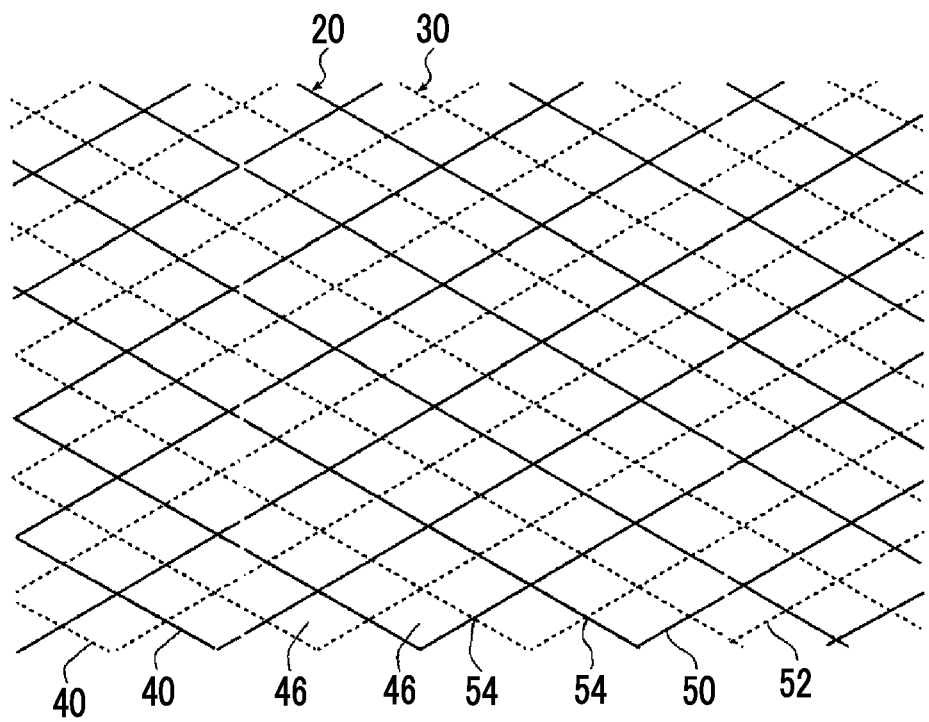
FIG. 13 is a plan view schematically showing another example of a state in which two electrode patterns of the conductive film shown in FIG. 7 are superimposed.

As shown in FIG. 13, in the case of the synthesized random electrode patterns of the both first electrode pattern 50 and second electrode pattern 52 constituted of the random rhombic cells 46 in which the angle is retained and only the pitch has irregularity, in the case in which the same line widths wa and wb of the thin metal wires 40 and the same distance d between the electrodes are applied, the conditions are satisfied in which the area A of the crossing portion 54 is 28.87 $\mu m^2$ (A=28.87 $\mu m^2$), the parameter Ca is 0.04, and the parameter Ca is 1.0 or less (Ca≤1.0).

Figure 14:
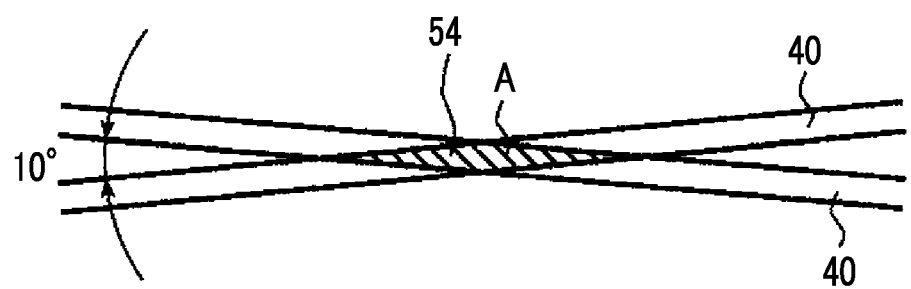
FIG. 14 is a plan view schematically showing one crossing portion in which the two electrode patterns of the conductive film are superimposed in an enlarged manner.

On the other hand, in the case of the synthesized random electrode patterns of the first electrode pattern 50 and second electrode pattern 52 crossing at a intersecting angle of 10° shown in FIG. 14, in the case in which the same line widths wa and wb of the thin metal wires 40 and the same distance d between the electrodes are applied, the conditions are not satisfied in which the area A of the crossing portion 54 is 143.97 $\mu m^2$ (A=143.97 $\mu m^2$), the parameter Ca is 1.19, and the parameter Ca is 1.0 or less (Ca≤1.0).

Figure 15:
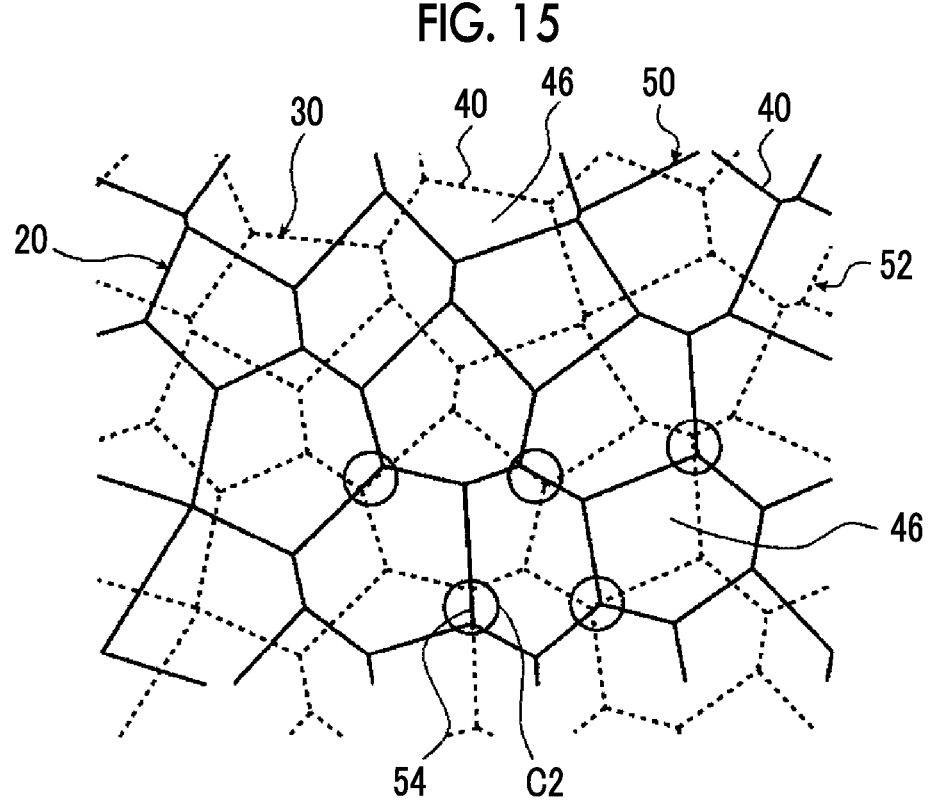
FIG. 15 is a plan view schematically showing another example of a state in which the two electrode patterns of the conductive film are superimposed.

Further, in the case of the synthesized random electrode patterns shown in FIG. 15, in the case in which the same line widths wa and wb of the thin metal wires 40 and the same distance d between the electrodes are applied, the conditions are not satisfied in which the area A of the crossing portion 54 indicated by a circle frame C2 in the drawing is 500 $\mu m^2$ (A=500 $\mu m^2$), the parameter Ca is 4.75, and the parameter Ca is 1.0 or less (Ca≤1.0).

However, in the present invention, in the conductive detection region, the electrode crossing region (crossing point) in which the first electrode and the second electrode cross each other may not be larger than the 5 mm×5 mm quadrangular region in some cases. Therefore, in the present invention, in the case in which the electrode crossing region is larger than or equal to the quadrangular region (equal to or larger than the quadrangular region), the quadrangular region is set in the electrode crossing region to form a set target region, and in the case in which the electrode crossing region is smaller than the quadrangular region, the electrode crossing region is set to be included in the quadrangular region to from a set target region.

That is, in the present invention, the term "5 mm×5 mm quadrangular region that is set to include the crossing region in which the first electrode 20 and the second electrode 30 cross each other" refers to a quadrangular region set in the electrode crossing region in the case in which the electrode crossing region is equal to or larger than the quadrangular region, and refers to a quadrangular region set to include all of the electrode crossing region in the case in which the electrode crossing region is smaller than the quadrangular region.

The crossing portion 54 or the overlapped portion in which the respective thin metal wires 40 constituting effective first electrode 20 and second electrode 30 cross each other in the 5 mm×5 mm quadrangular evaluation target region set as described above is specified to obtain a parameter Ca of the crossing portion (overlapped portion)

54. In this case, in an arbitrary 5 mm×5 mm quadrangular evaluation target region, the percentage of the crossing portion (overlapped portion) 54 in which the parameter Ca defined in the present invention is 1.0 or less is 90% or more, and thus the effects of the present invention can be obtained.

That is, in the present invention, when the parameters Ca of all of the crossing portions 54 present in the evaluation target region are obtained, it is required that first, the evaluation target region of the 5 mm×5 mm quadrangular region is set to include the crossing region in which the first electrode 20 and the second electrode 30 cross each other in the detection region, all crossing portions 54 in which the respective thin metal wires 40 constituting effective first electrode 20 and second electrode 30 cross each other are specified in the set evaluation target region, and then the parameter Ca of the specified all crossing portions 54 is obtained.

In the present invention, the reason for limiting the parameter Ca of 90% or more crossing portions 54 among all of the crossing portions 54 included in the evaluation target region to 1.0 or less is that when the crossing portion 54 in which the parameter Ca is more than 1.0 is present at more than 10%, that is, included, in the arbitrary target region in the detection region, the crossing portion 54 is a place where the electrostatic capacitance is locally large and the in-plane stability as the touch panel sensor 10 collapses to cause a problem in in-plane stability.

Depending on the IC to be driven, normally, the capacitance value between different electrodes does not have a fixed tendency and fluctuates by more than 10%, which has a significant influence on performance. Alternatively, the crossing portion which does not have a fixed tendency and has a capacitance value more than two times the capacitance being present in one electrode intersection causes significant nonuniformity in symmetry of the electrodes.

Even in the case in which the line widths wa and wb of the thin metal wires and the thickness d of the substrate are defined within the most desirable ranges, in the case of Ca of more than 1.0, even in the case in which the area A of the crossing portion is the smallest, the area A of the crossing portion is 2.2 times the area of the standard crossing portion and thus the electrode intersection has a crossing portion having capacitance value more than two times the capacitance. In addition, in the case in which the percentage of the crossing portion present in the electrode intersection is 10%, for entire the electrode intersection, the capacitance is increased by 12% and thus the capacitance fluctuates by 10% or more.

Figure 16A:
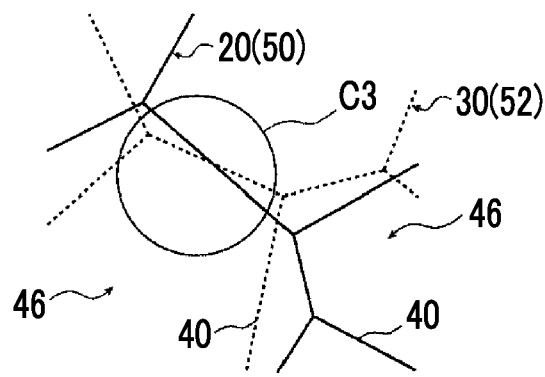
FIGS. 16A, 16B, and 16C are plan views schematically showing other examples of a state in which the two random electrode patterns of the conductive film shown in FIG. 2 are superimposed, respectively.

However, in the example shown in FIG. 4, the overlapped portion in which the thin metal wire 40 constituting the first electrode 20 and the thin metal wire 40 constituting the second electrode 30 are superimposed (a first overlapped portion in the present invention) is the crossing portion 54 in which the both thin metal wires 40 simply cross at a predetermined angle, but the present invention is not limited thereto. The overlapped portion may be a portion in which the two thin metal wires 40 on the both upper and lower sides are superimposed in the width direction thereof as indicated by the circle C2 in FIG. 15 and a circle C3 in FIG. 16A, that is, a portion in which the thin metal wires are completely or partially superimposed in parallel, or a portion in which the thin metal wires are partially or substantially completely superimposed even when the thin metal wires are not parallel with each other.

In addition, in the present invention, when regions on both sides along the center lines in a range of four times of the line widths wa and wb (μm) of the respective thin metal wires 40 from the center lines of each of the thin metal wires 40 of the first electrode 20 and the second electrode 30 in a width direction thereof are respectively set to vicinity regions 58 as shown in FIG. 4, the overlapped portion 56 in which the vicinity region 58 of the thin metal wire 40 constituting the first electrode 20 and the vicinity region 58 of the thin metal wire 40 constituting the second electrode 30 are superimposed in plan view with the substrate 16 interposed therebetween (a second overlapped portion in the present invention) can be a crossing portion in which the respective vicinity regions 58 of the two thin metal wires 40 on the both upper and lower sides cross each other, or a portion in which the respective vicinity regions 58 of the two thin metal wires 40 on the both upper and lower sides are superimposed in the width direction thereof, that is, a portion in which the thin metal wires are completely or partially superimposed in parallel, or a portion in which the thin metal wires are partially or substantially completely superimposed even when the thin metal wires are not parallel with each other.

Here, in the case in which the area of the overlapped portion 56 in which the two vicinity regions 58 are superimposed is set to B (μm$^2$), as described above, the line widths of the respective thin metal wires 40 are set to wa (μm) and wb (μm) and a distance between the first electrode 20 and the second electrode 30 in the thickness direction of the substrate 16 is set to d (μm), it is required that, in the arbitrary 5 mm×5 mm quadrangular region that is set to include the crossing point in which the first electrode 20 and the second electrode 30 are superimposed to cross (are perpendicular to) each other in the detection region, that is, in any of 5 mm×5 mm quadrangular evaluation target regions, a parameter Cb represented by the following Equation (2) in 90% or more overlapped portions 56 among all of the overlapped portions 56 included in the target region is 0.5 or less (Cb≤0.5).

$$Cb = (B/16 - wa*wb)/d \quad (2)$$

In other words, it is required that the percentage of the overlapped portion 56 in which the parameter Cb represented by the above Equation (2) is more than 0.5 which is included in an arbitrary set target region in the detection region, that is, in any of set target regions, is not more than 10%.

As described above, in the present invention, in the case in which the line width wa of the thin metal wire 40 constituting the first electrode 20 is equal to the line width wb of the thin metal wire 40 constituting the second electrode 30, the widths can be represented by wa=wb=w, and the above Equation (2) can be represented by the following Equation (2A).

$$Cb = (B/16 - w^2)/d \quad (2A)$$

For example, in the case of the above-described synthesized random electrode patterns shown in FIGS. 3 and 13, the conditions are satisfied in which the area B of the second overlapped portion 56 of each electrode pattern is respectively 461.88 μm$^2$ (B=461.88 μm$^2$) and 461.88 μm$^2$ (B=461.88 μm$^2$), the parameter Cb of the both electrode patterns is 0.04, and the parameter Cb of the both electrode patterns is 0.5 (Cb≤0.5) or less.

On the other hand, in the case in which the synthesized regular electrode pattern shown in FIG. 14 and the synthesized random electrode pattern shown in FIG. 15, the conditions are not satisfied in which the area B of the second overlapped portion 56 of the both electrode patterns is respectively 2,303 μm$^2$ (B=2,303 μm$^2$) and 2,320 μm$^2$ (B=2, 320 µm²), the parameter Cb thereof is respectively 1.19 and 1.2, and the parameter Cb of the both electrode patterns is 0.5 (Cb≤0.5) or less.

In the present invention, the overlapped portion 56, as an overlapped point, in which the vicinity regions 58 of the respective thin metal wires 40 constituting effective first electrode 20 and second electrode 30 are overlapped with each other in the 5 mm×5 mm quadrangular evaluation target region set as described is specified and the parameter Cb of the overlapped portion 56 is obtained.

In this case, when the percentage of the overlapped portion 56 in which the parameter Cb defined in the present invention is 0.5 or less is 90% or more in the arbitrary 5 mm×5 mm quadrangular evaluation target region in the conductive detection region, the effects of the present invention can be obtained.

That is, in the present invention, when the parameters Cb of all of the overlapped portion 56 present in the evaluation target region are obtained, first, a 5 mm×5 mm quadrangular evaluation target region may be set to include a crossing region in which the first electrode 20 and the second electrode 30 cross in the detection region, and all overlapped portions 56 in which the vicinity regions 58 of the respective thin metal wires 40 constituting effective first electrode 20 and second electrode 30 are overlapped with each other in the set evaluation target region may be specified to obtain the parameter Cb with respect to all of the specified overlapped portions 56.

In the present invention, the reason for limiting the parameter Cb of 90% or more overlapped portions 56 among all of the overlapped portions 56 included in the evaluation target region to 0.5 or less is that when the percentage of the overlapped portion 56 in which the parameter Cb is more than 0.5 in an arbitrary target region present, that is, included, in the detection region is more than 10%, the overlapped portion 56 is a place where the electrostatic capacitance is locally large and in-plane stability as the touch panel sensor 10 collapses to cause a problem.

Figure 16B:
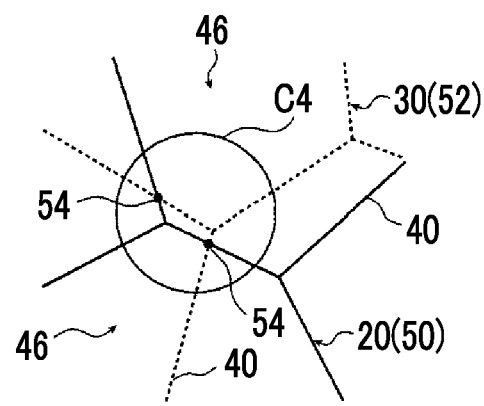
Figure 16C:
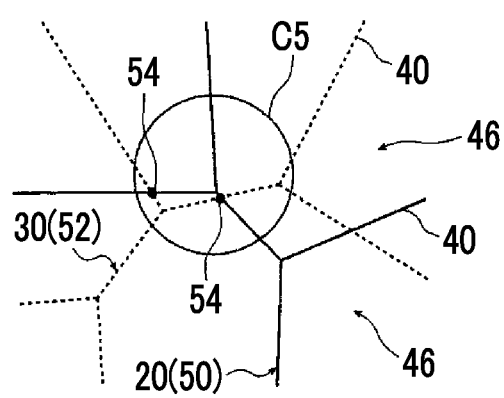

In the present invention, the reason for using the parameter Cb represented by the above Equation (2) for the overlapped portion 56 in which two vicinity regions 58 of the both thin metal wires 40 of the first electrode 20 and the second electrode 30 are superimposed in an arbitrary target region in the detection region is that the place in which the electrostatic capacitance is locally large as described above is formed at a place where there is a crossing portion as in the case in which the both thin metal wires 40 of the first electrode 20 and the second electrode 30 approach and are parallel with each other without crossing as shown in the circle C4 in FIG. 16B, or the case in which the thin metal wires cross to have a parameter Ca of 1.0 or less but there is another crossing portion just near the crossing portion as shown in the circle C5 in FIG. 16C, or the like, and in-plane stability as the touch panel sensor 10 collapses to cause a problem.

Here, when a distance d (µm) between the first electrode 20 and the second electrode 30 in the thickness direction of the substrate 16 is preferably 100 µm or less, more preferably 20 µm or more, and even more preferably within a range of 30 µm to 100 µm.

In the example shown in FIG. 2, since the distance d can be set to the thickness of the substrate 16, the thickness of the substrate is preferably 100 µm or less, more preferably 20 µm or more, and even more preferably within a range of 30 µm to 100 µm.

Here, when the thickness of the substrate is set to 100 µm or less, the thickness of the touch panel can be reduced. In addition, when the thickness of the substrate is set to 20 µm or more, the capacitance of the electrode crossing portion has an appropriate value and thus this case is preferable.

The conductive film according to the first embodiment of the present invention and the touch panel sensor provided with the same basically have the above configurations.

In the conductive film 12 according to the first embodiment shown in FIG. 2, the first electrode 20 and the second electrode 30 are respectively formed on the both upper side and lower side surfaces of the substrate 16, but the present invention is not limited thereto. As in a conductive film 12A according to a second embodiment of the present invention shown in FIG. 5, a configuration in which two conductive film elements in which the first electrode 20 and the second electrode 30 constituted of the plurality of thin metal wires 40 are formed are superimposed on one surface of each of two substrates 16 and 17 (the upper surface in FIG. 5) may be adopted.

Figure 5:
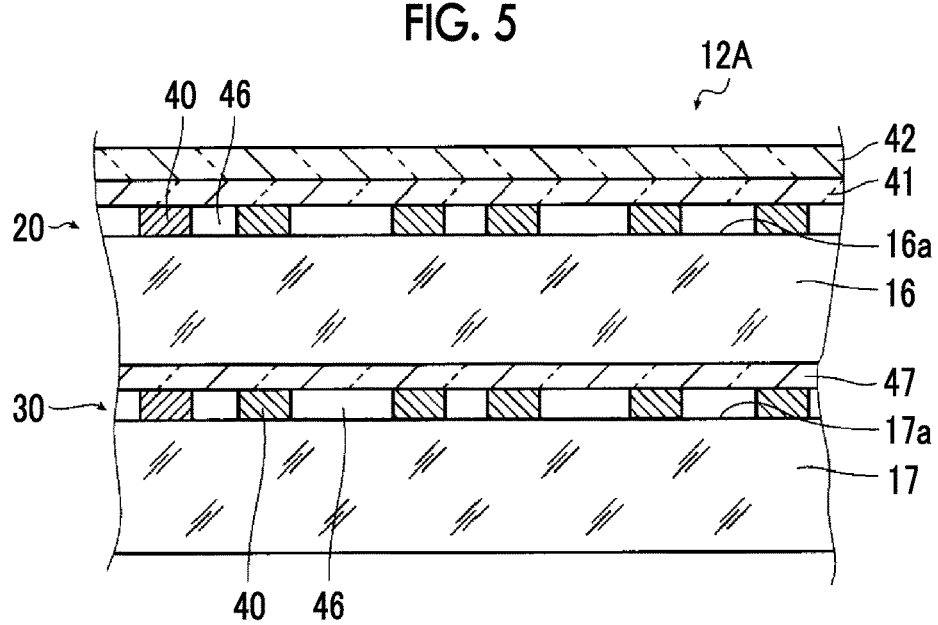
FIG. 5 is a schematic cross-sectional view showing another example of a conductive film according to another embodiment of the present invention.

The conductive film 12A according to the second embodiment of the present invention shown in FIG. 5 has a lower side second substrate 17, a second electrode 30 which is constituted of plurality of thin metal wires 40 which is formed on an upper side surface 17a of the second substrate 17, an adhesive layer 47 which is formed on the second electrode 30 so as to cover the plurality of thin metal wires 40, an upper side first substrate (substrate) 16 which is arranged to adhere on the second electrode 30 by the adhesive layer 47, a first electrode 20 which is constituted of the plurality of thin metal wires 40 formed on an upper side surface 16a of the first substrate 16, and a protective layer 42 which adheres onto the first electrode 20 with an adhesive layer 41 interposed therebetween in FIG. 5.

Here, at least one of first electrode pattern 50 or second electrode pattern 52 constituted of a plurality of cells 46 is entirely or partially formed of a random electrode pattern to which irregularity is imparted by the thin metal wires 40 of the first electrode 20 and the second electrode 30.

As shown in FIG. 3 described above, each of the first electrode pattern 50 and the second electrode pattern 52 of the first electrode 20 and the second electrode 30 is a random electrode pattern constituted by combining the plurality of polygonal cells 46 formed of the thin metal wires 40 with irregularity, but the present invention is not limited thereto. At least one of the first electrode pattern 50 or the second electrode pattern 52 is entirely or partially formed of a random electrode pattern constituted by combining the polygonal cells 46 with irregularity.

Next, another example of the electrode pattern used as at least one of the first electrode pattern 50 or the second electrode pattern 52 of the first electrode 20 and the second electrode 30 will be described.

Figure 6:
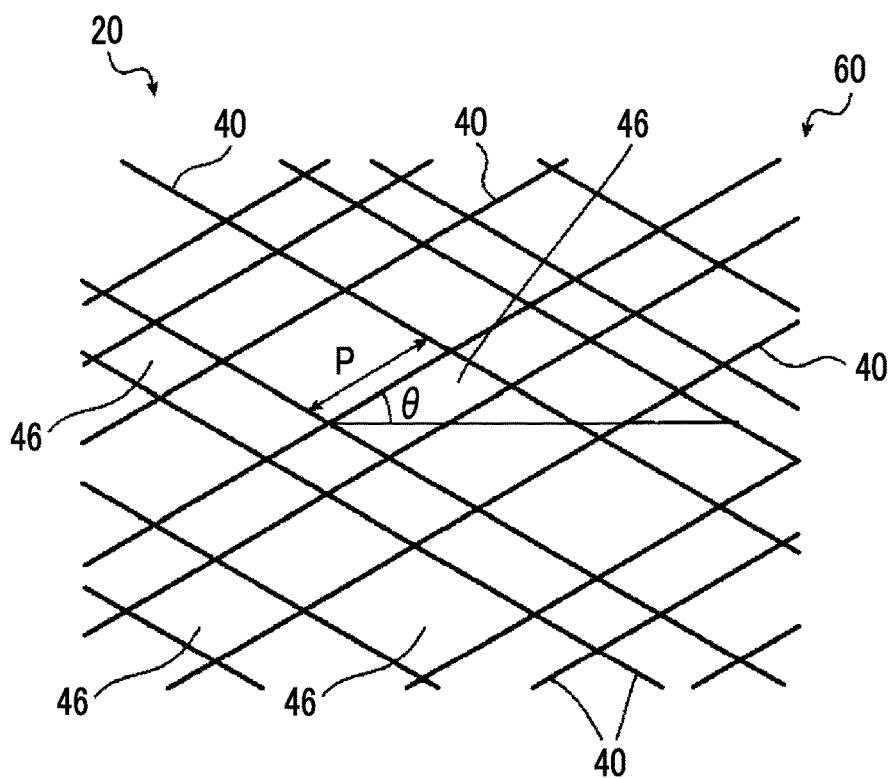
FIG. 6 is a plan view schematically showing an example of a random electrode pattern of the conductive film of the present invention with irregularity.
Figure 7:
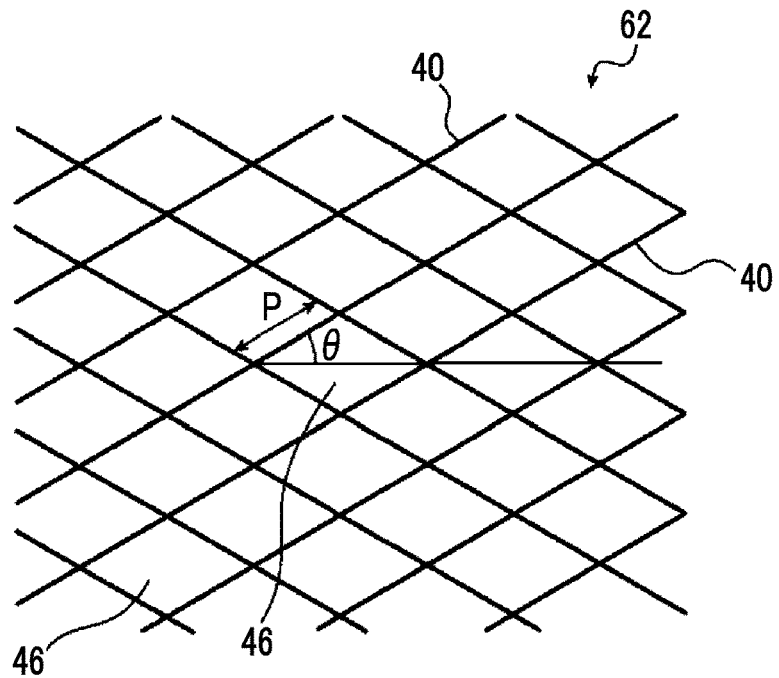
FIG. 7 is a plan view schematically showing an example of a rhombic electrode pattern with regularity before irregularity is imparted to the electrode pattern to obtain the random electrode pattern shown in FIG. 6.

FIG. 6 is a plan view schematically showing an example of a random electrode pattern of the conductive film of the present invention with irregularity. FIG. 7 is a plan view schematically showing an example of a rhombic electrode pattern with regularity before irregularity is imparted to the electrode pattern to obtain the random electrode pattern shown in FIG. 6.

A random electrode pattern 60 shown in FIG. 6 is a mesh pattern in which the cells 46 having a predetermined quadrangular shape formed by arranging the plurality of thin metal wires 40 to cross each other are arranged.

Specifically, the random electrode pattern 60 shown in FIG. 6 has the thin metal wires 40 and the cell 46 between adjacent thin metal wires 40, and is an irregular mesh pattern in which the plurality of cells 46 each having a parallelogram shape, which maintains a predetermined angle θ in plan view and has a different pitch P (thus, size or length of the side), are continuously connected in two directions which form a predetermined angle θ.

Here, the random electrode pattern 60 with irregularity shown in FIG. 6 is a random electrode pattern with irregularity (randomness) in a predetermined range while keeping a predetermined angle θ to the rhombic pitch P of the cell 46 of a rhombic mesh pattern with regularity in which the plurality of same rhombic cells 46 shown in FIG. 7 are repeatedly arranged in a regular manner, a so-called regular electrode pattern 62.

Here, in the random electrode pattern 60, the predetermined range of irregularity relating to the length of the side imparted to the rhombic shape of the cell 46 of the rhombic regular electrode pattern 62 while maintaining the angle θ is preferably more than 0% and 10% or less, more preferably 2% to 10%, and even more preferably 2% to 8%.

In addition, in the random electrode pattern 60, regarding irregularity imparted to the pitch of the rhombic shape of the cell 46 of the rhombic regular electrode pattern 62 having regularity, for example, the distribution of the irregularity may be normal distribution or uniform distribution.

Figure 8:
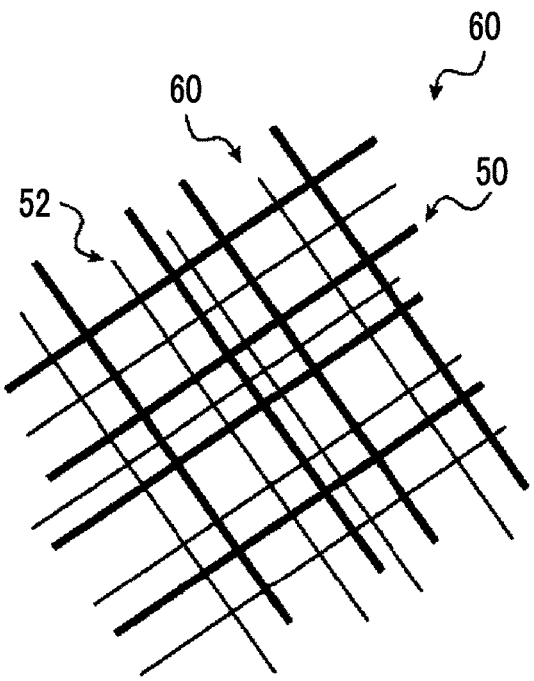
FIG. 8 is a plan view schematically showing an example of a state in which the random electrode pattern shown in FIG. 6 and another random electrode pattern are superimposed.

FIG. 8 shows an example of a state in which, when the random electrode pattern 60 shown in FIG. 6 is used as the first electrode pattern 50 and the second electrode pattern 52 of the first electrode 20 and the second electrode 30, the both electrode patterns 60 are superimposed, that is, an example of a randomized synthesized electrode pattern.

Figure 9:
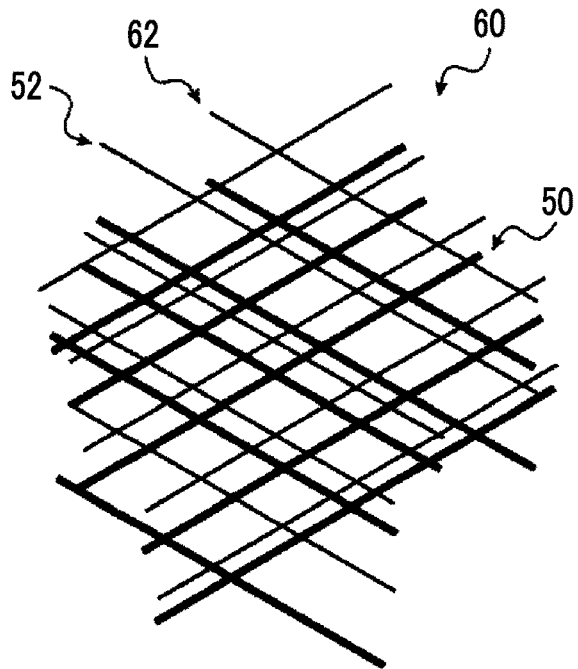
FIG. 9 is a plan view schematically showing an example of a state in which the random electrode pattern shown in FIG. 6 and the regular electrode pattern shown in FIG. 7 are superimposed.

Further, in FIG. 9 shows another example of a state in which, when the random electrode pattern 60 shown in FIG. 6 and the regular electrode pattern 62 shown in FIG. 7 are respectively used as the first electrode pattern 50 and the second electrode pattern 52 of the first electrode 20 and the second electrode 30, the both electrode patterns 60 and 62 are superimposed, that is, another example of a randomized synthesized electrode pattern.

In FIGS. 8 and 9, in order to facilitate understanding, the plurality of thin metal wires 40 constituting the upper side first electrode pattern 50 are indicated by a thick line and the plurality of thin metal wires 40 constituting the lower side second electrode pattern 52 are indicated by a thin line. However, it is needless to say that the widths of the thick line and the thin line do not represent the line widths of the width of the thin metal wires 40 and the widths thereof may be the same or different each other.

In the example shown in FIG. 8, the random electrode pattern 60 is used as both the first electrode pattern 50 and the second electrode pattern 52, but the random electrode patterns 60 may be completely the same or different from each other.

In addition, in the example shown in FIG. 9, the random electrode pattern 60 is used as the first electrode pattern 50 and the regular electrode pattern 62 is used as the second electrode pattern 52. In contrast, the regular electrode pattern 62 may be used as the first electrode pattern 50 and the random electrode pattern 60 may be used as the second electrode pattern 52.

Even in the examples shown in FIGS. 8 and 9, as described above, needless to say, the condition is satisfied in which the parameter Ca of the overlapped portion (crossing portion, superimposed region) 54 of the two thin metal wires 40 constituting the first electrode pattern 50 and the second electrode pattern 52 is 1.0 or less in 90% or more overlapped portions 54, and the condition is also satisfied in which the parameter Cb of the overlapped portion (crossing portion, superimposed region) 56 of the vicinity regions of the two thin metal wires 40 is 0.5 or less in 90% or more overlapped portions 56.

Figure 10:
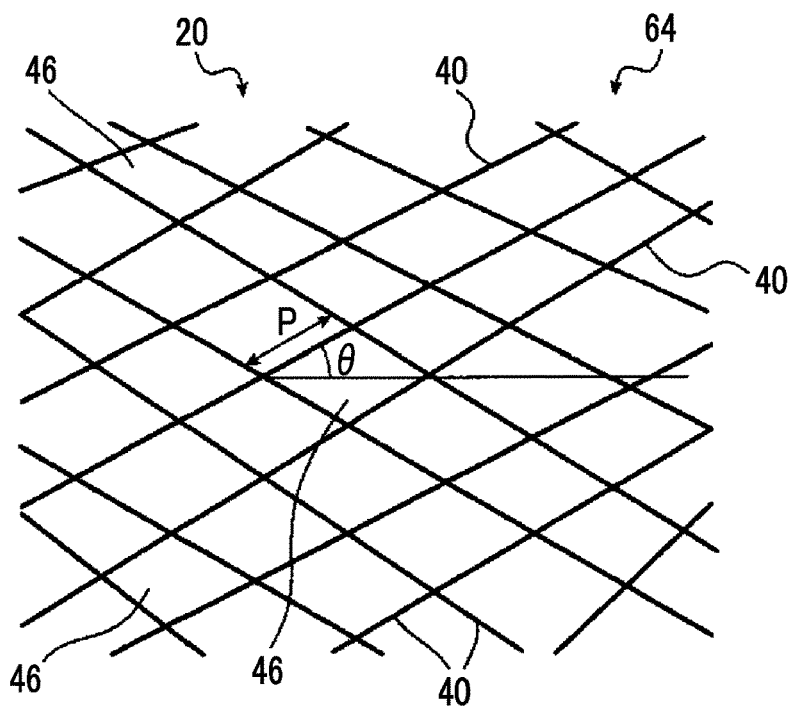
FIG. 10 is a plan view schematically showing another example of a random electrode pattern obtained by imparting irregularity to the rhombic regular electrode pattern with regularity shown in FIG. 7.

In addition, in the present invention, instead of using the random electrode pattern 60 shown in FIG. 6, a random electrode pattern 64 in which irregularity is imparted to the rhombic shape of the regular electrode pattern 62 shown in FIG. 7 at the angle shown in FIG. 10 may be used.

The random electrode pattern 64 is a mesh pattern in which the cells 46 having a predetermined quadrangular shape formed by arranging the plurality of thin metal wires 40 to cross each other are arranged.

Specifically, the random electrode pattern 64 shown in FIG. 10 is an irregular random mesh pattern in which the plurality of cells 46 each having one of two facing sides constituted of the thin metal wires 40 being inclined to the other side and having a rectangular shape deformed from the rhombic shape not to be parallel with each other continuously connected in two predetermined directions. The random electrode pattern 64 is a pattern in which the angle is changed and not maintained in the plurality of adjacent rectangular cells 46 and as a result, the pitch P or the length of the side is also changed and not maintained according to a change in the angle. In other words, the random electrode pattern 64 is a random mesh pattern with irregularity which is a quadrangle in which the angles θ of the plurality of adjacent rectangular cells 46 are different and as a result, the pitch P or the length of the side is also different.

The random electrode pattern 64 with irregularity shown in FIG. 10 is a random electrode pattern which is the regular pattern shown in FIG. 7 described above and irregularity (randomness) in a predetermined range is imparted to the angle θ of the rhombic shape of the cell 46 of the rhombic regular electrode pattern 62.

Here, in the random electrode pattern 64, the predetermined range of irregularity imparted to the rhombic angle θ of the cell 46 of the rhombic regular electrode pattern 62 having regularity is preferably more than 0% and 3% or less, more preferably 0.2% to 3%, and even more preferably 0.5% to 3%.

In addition, in the random electrode pattern 64, the irregularity imparted to the angle θ of the rhombic cell 46 of the rhombic regular electrode pattern 62 having regularity is not particularly limited and any irregularity may be imparted as long as the above-described range is satisfied. For example, the distribution of the irregularity may be normal distribution or uniform distribution.

Figure 11:
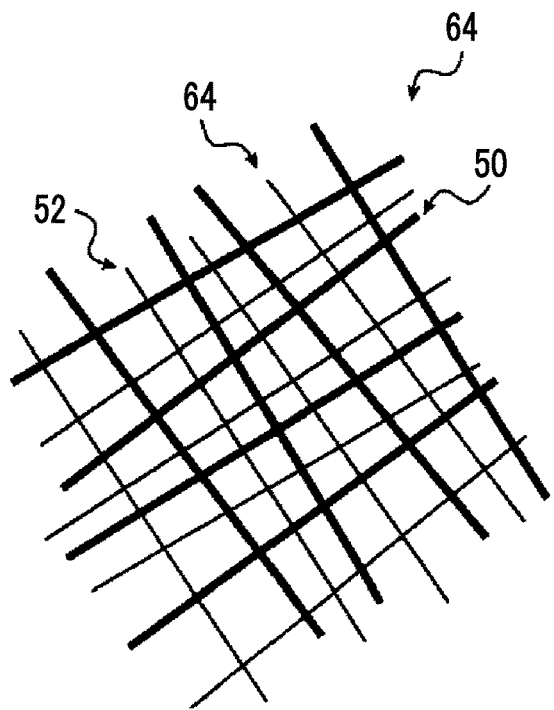
FIG. 11 is a plan view schematically showing an example of a state in which the random electrode pattern shown in FIG. 10 and another random electrode pattern are superimposed.

FIG. 11 shows an example of a state in which, when the random electrode pattern 64 shown in FIG. 10 is used as the first electrode pattern 50 and the second electrode pattern 52 of the first electrode 20 and the second electrode 30, the both electrode patterns 64 are superimposed, that is, an example of a randomized synthesized electrode pattern.

Figure 12:
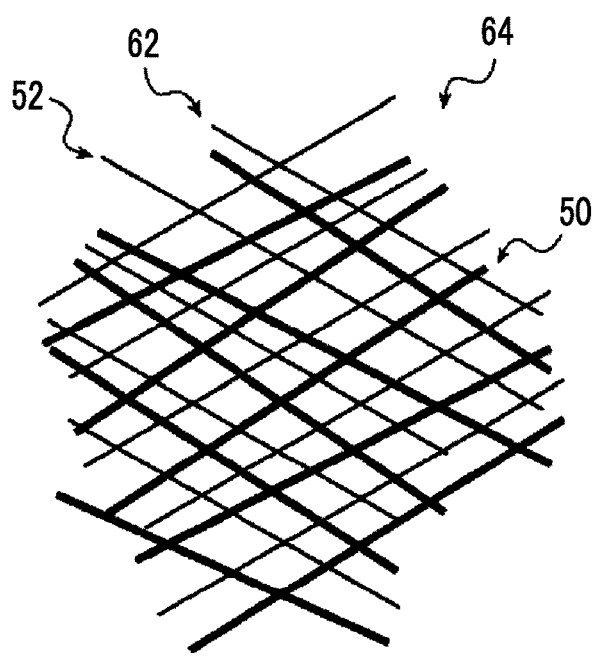
FIG. 12 is a plan view schematically showing an example of a state in which the random electrode pattern shown in FIG. 10 and the regular electrode pattern shown in FIG. 7 are superimposed.

In addition, FIG. 12 is another example of a state in which, when the random electrode pattern 64 shown in FIG. 10 and the regular electrode pattern 62 shown in FIG. 7 are respectively used as the first electrode pattern 50 and the second electrode pattern 52 of the first electrode 20 and the second electrode 30, the both electrode patterns 64 and 62 are superimposed, that is, another example of a randomized synthesized electrode pattern.

In FIGS. 11 and 12, as in FIGS. 8 and 9, in order to facilitate understanding, the plurality of thin metal wires 40 constituting the upper side first electrode pattern 50 is indicated by a thick line and the plurality of thin metal wires 40 constituting the lower side second electrode pattern 52 is indicated by a thin line. However, it is needless to say that the widths of the thick line and the thin line do not represent the line widths of the width of the thin metal wires 40 and the widths thereof may be the same or different each other.

In the example shown in FIG. 11, the random electrode pattern 64 is used as the first electrode pattern 50 and the second electrode pattern 52, but the random electrode patterns 64 may be the same or different from each other. In addition, the random electrode pattern 60 shown in FIG. 6 may be used as one of the first electrode pattern 50 and the second electrode pattern 52.

Further, in the example shown in FIG. 12, the random electrode pattern 64 is used as both the first electrode pattern 50 and the regular electrode pattern 62 is used as the second electrode pattern 52. In contrast, the regular electrode pattern 62 may be used as the first electrode pattern 50 and the random electrode pattern 64 may be used as the second electrode pattern 52.

Even in the examples shown in FIGS. 11 and 12, as described above, needless to say, the condition is satisfied in which the parameter Ca of the overlapped portion (crossing portion, superimposed region) 54 of the two thin metal wires 40 constituting the first electrode pattern 50 and the second electrode pattern 52 is 1.0 or less in 90% or more overlapped portions 54, and the condition is also satisfied in which the parameter Cb of the overlapped portion (crossing portion, superimposed region) 56 of the vicinity regions of the two thin metal wires 40 is 0.5 or less in 90% or more overlapped portions 56.

In the random electrode pattern 64 shown in FIG. 10, the random electrode pattern 60 shown in FIG. 6, and the regular electrode pattern 62 shown in FIG. 7, the side of the thin metal wired 40 constituting the cell 46 may be disconnected. As the shape of a mesh-like pattern with disconnection, the shape of a mesh-like pattern of a conductive film described in JP2012-276175 relating to the application of this applicant can be applied.

As described above, since the random electrode pattern is used as at least one of the first electrode pattern 50 or the second electrode pattern 52 in the present invention, the visibility of the thin metal wires 40 of each of the electrode pattern 52 and the visibility of the synthesized electrode pattern of each of the electrode pattern 52, and specifically, the occurrence of moire due to interference between the synthesized electrode pattern and the black matrix (BM) or the pixel arrangement pattern of RGB pixels of the display device can be suppressed.

The conductive film according to the present invention and the touch panel sensor provided with the same basically have the above configurations.

In the above-described example, the first electrode and the second electrode are respectively arranged on both sides of the substrate interposed therebetween, the first electrode pattern of the first electrode and the second electrode pattern of the second electrode are respectively arranged to face both sides of the substrate while interposing the substrate therebetween and to cross or overlap each other, and the overlapped portion is formed by overlapping the thin metal wire constituting the first electrode and the thin metal wire constituting the second electrode in plan view with the substrate interposed therebetween, but the present invention is not limited thereto. It is needless to say that the first electrode and the second electrode may be respectively arranged on one side of the substrate through an insulating layer, the first electrode pattern of the first electrode and the second electrode pattern of the second electrode may be respectively arranged to face both sides of the insulating layer while interposing the insulating layer therebetween and to cross or overlap each other, and the overlapped portion may be formed by overlapping the thin metal wire constituting the first electrode and the thin metal wire constituting the second electrode in plan view with the substrate interposed therebetween.

The conductive film according to the present invention and the touch panel sensor provided with the same have been described above using various embodiments and examples. However, the present invention is not limited to the above embodiments and examples. Various improvements and modifications may be made within a range not departing from the spirit of the present invention.

EXAMPLES

Hereinafter, the present invention will be described in detail based on examples.

Example 1

Figure 17:
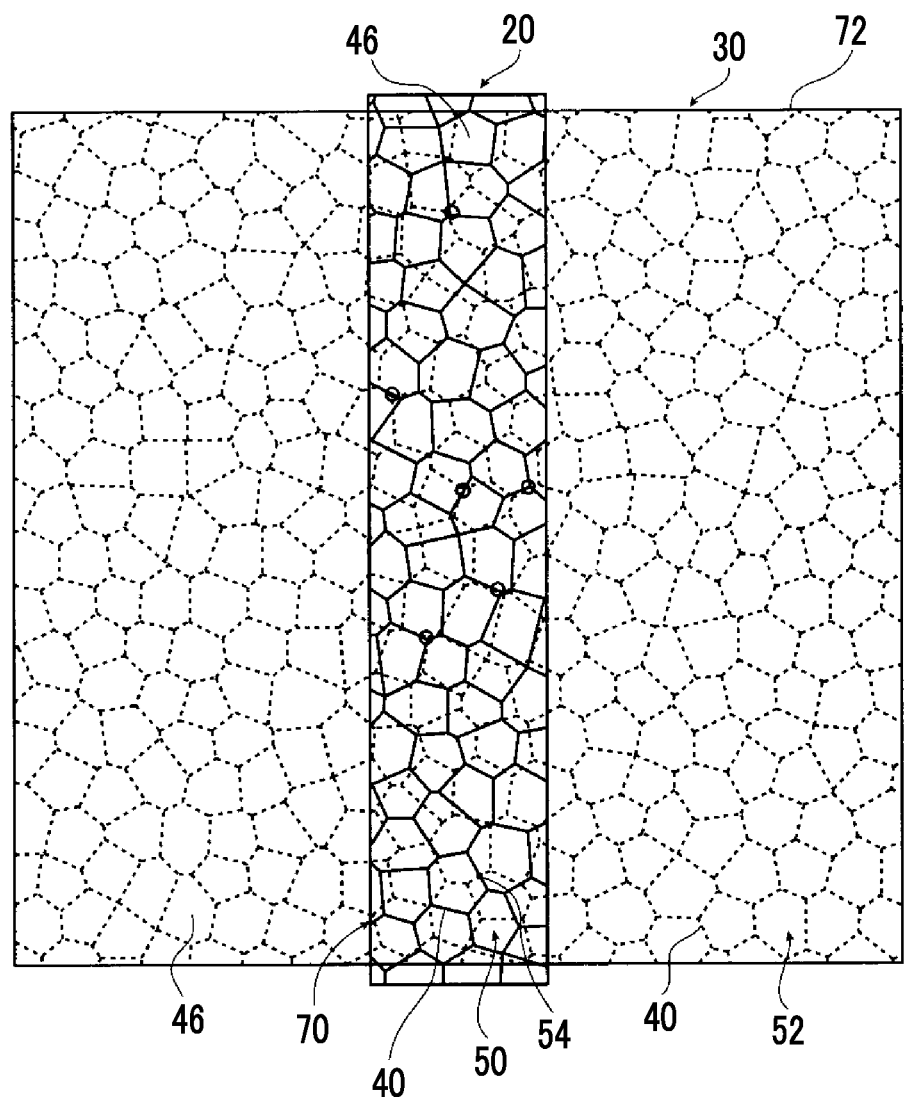
FIG. 17 is a plan view schematically showing another example of a state in which two electrode patterns are superimposed in an evaluation target region for a conductive film used in Example 1.

For Example 1, a sensor portion of a touch panel sensor was configured by using a conductive film having a synthesized electrode pattern in which the first electrode pattern 50 of the first electrode 20 having an electrode width of 1 mm and the second electrode pattern 52 of the second electrode 30 having an electrode width of 4.8 mm were overlapped with the substrate 16 interposed therebetween such that the first electrode 20 was positioned at the center of the second electrode 30 as shown in FIG. 17. Here, both the first electrode pattern 50 and the second electrode pattern 52 were random electrode patterns with irregularity constituted by the random polygonal cells 46.

In the sensor portion, since the region of the first electrode 20 superimposed on the second electrode 30 became an electrode crossing region 70, a 5 mm×5 mm quadrangular region was set as an evaluation target region 72 so as to include the entire width of the second electrode 30 having a width of 4.8 mm.

In the electrode crossing region 70 included in the target region 72, all of the crossing portions (first overlapped portions) 54 of the thin metal wires 40 of the first electrode pattern 50 indicated by a solid line in FIG. 17 and the thin metal wires 40 of the second electrode pattern 52 indicated by a broken line in FIG. 17 were selected to obtain the number of crossing portions, and the parameters Ca of all of the selected crossing portions 54 were calculated to obtain the number of the crossing portions. The percentage (proportion) of the obtained number of crossing portions with respect to the total number of crossing portions 54 was obtained. Further, the electrode crossing region 70 shown in FIG. 17 was visually observed to evaluate the occurrence of moire. In addition, the target region 72 set in FIG. 17 was touched with a finger from the operation side to evaluate responsiveness.

The crossing portion 54 indicated by a circle frame in FIG. 17 represented a crossing portion 54 in which the parameter Ca was more than 1.0, and the number of crossing portions in the electrode crossing region 70 was 17. The total number of crossing portions 54 in the electrode crossing region 70 was 132.

The line widths wa and wb of the thin metal wires 40 in Example 1 were both 5 μm (wa=wb=w=5 μm), and a distance d between the thin metal wire 40 of the first electrode pattern 50 and the thin metal wire 40 of the second electrode pattern 52 was 100 μm (d=100 μm).

The number of all of the crossing portions 54 obtained, the number of crossing portions 54 in which the value of the parameter Ca was more than 1.0, the proportion of the crossing portion 54 in which the value of the parameter Ca was more than 1.0 with respect to the total number of crossing portions 54, the occurrence of moire, and the evaluation result of responsiveness are shown in Table 1.

Incidentally, the responsiveness was evaluated as follows.

A diagonal 6-inch electrostatic capacitive type sensor in which the thin metal wires was arranged over the entire surface was formed, a sensor module formed by laminating glass having a thickness of 0.55 mm, an OCA having a thickness of 0.1 mm, an electrostatic capacitive sensor having a thickness of 0.1 mm, an OCA having a thickness of 0.1 mm, and a PET film having a thickness of 0.05 mm, and then an IC, manufactured by Atmel Corporation, for driving was connected thereto.

The responses when the module sensor was driven and a pen having a tip end diameter of 2 mm was moved by driving was evaluated based on five grades as follows.

In the case in which the responses was made without any stress even in the case of moving the pen at a high speed, the evaluation index of responsiveness was set to 5.

In the case in which the responses was made without a practical problem even in the case of moving the pen at a high speed, the evaluation index of responsiveness was set to 4.

In the case in which the responses was made without a practical stress only in the case of moving the pen at a low speed, the evaluation index of responsiveness was set to 3.

In the case in which there was a shift between the position indicated by the pen and the responding position, the evaluation index of responsiveness was set to 2.

In the case in which there was a place in which the position indicated by the pen was not recognizable, the evaluation index of responsiveness was set to 1.

Comparative Example 1

Figure 18A:
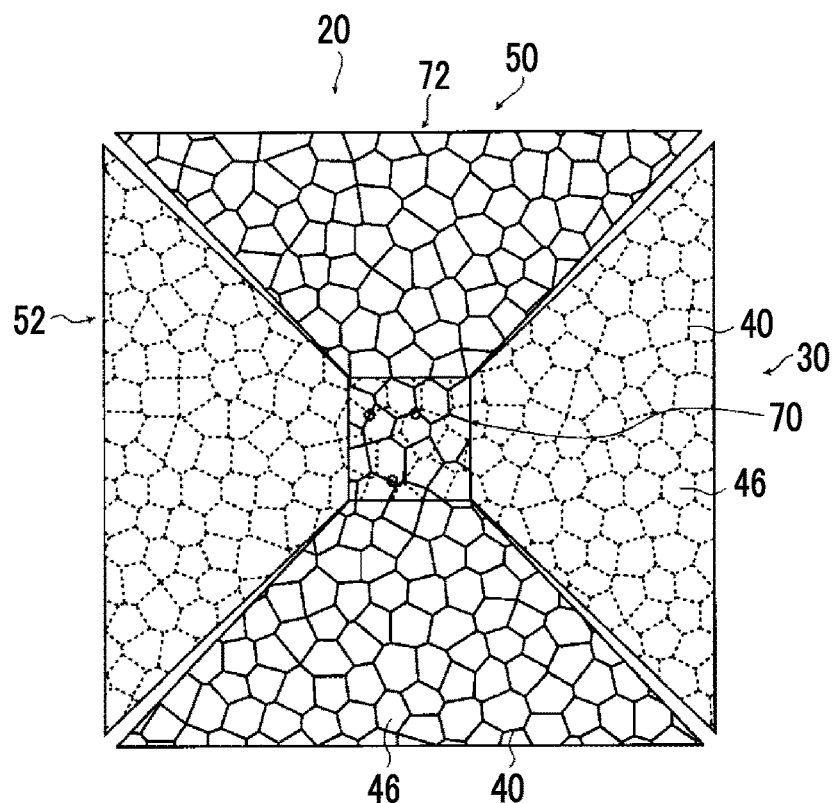
FIGS. 18A and 18B are a plan view schematically showing a state in which two electrode patterns are superimposed in an evaluation target region of a conductive film used in Comparative Example 1 and a partially enlarged plan view schematically showing an electrode crossing region at the center thereof, respectively.

For Comparative Example 1, a sensor portion of a touch panel sensor was configured by a conductive film having a synthesized electrode pattern in which the diamond-shaped first electrode pattern 50 of the first electrode 20 in which the electrode width of the electrode crossing region 70 was 1 mm and the diamond-shaped second electrode pattern 52 of the second electrode 30 in which the electrode width of the electrode crossing region 70 was 1 mm were overlapped with the substrate 16 interposed therebetween so as to cross (be perpendicular to) each other in the electrode crossing region 70 at the center of the drawing as shown in FIG. 18A. Here, both the first electrode pattern 50 and the second electrode pattern 52 were random electrode patterns with irregularity constituted by the random polygonal cells 46.

Figure 18B:
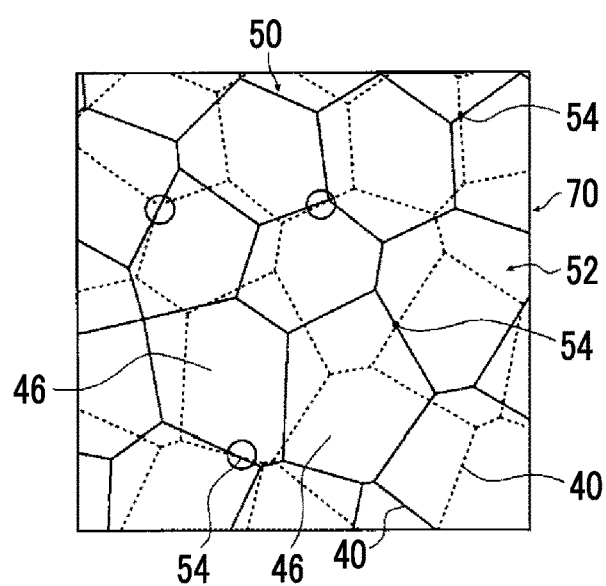

In the sensor portion, a 5 mm×5 mm quadrangular region was set as an evaluation target region 72 so as to include the electrode crossing region 70 in which the first electrode 20 and the second electrode 30 were superimposed to cross each other at the center. In FIG. 18B, the electrode crossing region 70 is shown in an enlarged manner.

In the electrode crossing region 70 included in the target region 72, all of the crossing portions (first overlapped portions) 54 of the thin metal wires 40 of the first electrode pattern 50 indicated by a solid line in FIG. 18B and the thin metal wires 40 of the second electrode pattern 52 indicated by a broken line in FIG. 18B were selected to obtain the number of the selected crossing portions. The parameters Ca of all of the selected crossing portions 54 was calculated to obtain the number of the crossing portions. The percentage (proportion) of the obtained number of crossing portions with respect to the total number of crossing portions 54 was obtained. Further, the electrode crossing region 70 shown in FIG. 18B was visually observed to evaluate the occurrence of moire. In addition, the set target region 72 shown in FIG. 18A was touched with a finger from the operation side to evaluate responsiveness.

The crossing portion 54 indicated by the circle frames in FIGS. 18A and 18B represented a crossing region 54 in which the parameter Ca was more than 1.0 and the number of crossing portions in the electrode crossing region 70 was 13. The total number of crossing portions 54 in the electrode crossing region 70 was 27.

The line widths wa and wb of the thin metal wires 40 in Comparative Example 1 were both 5 μm (wa=wb=w=5 μm), and a distance d between the thin metal wires 40 of the first electrode pattern 50 and the second electrode pattern 52 was 100 μm (d=100 μm).

The number of crossing portions 54 obtained, the number of crossing portions 54 in which the value of the parameter Ca was more than 1.0, the proportion of the crossing portion 54 in which the value of the parameter Ca was more than 1.0 with respect to the total number of crossing portions 54, the occurrence of moire, and the evaluation result of responsiveness are shown in Table 1.

Example 2

Figure 19:
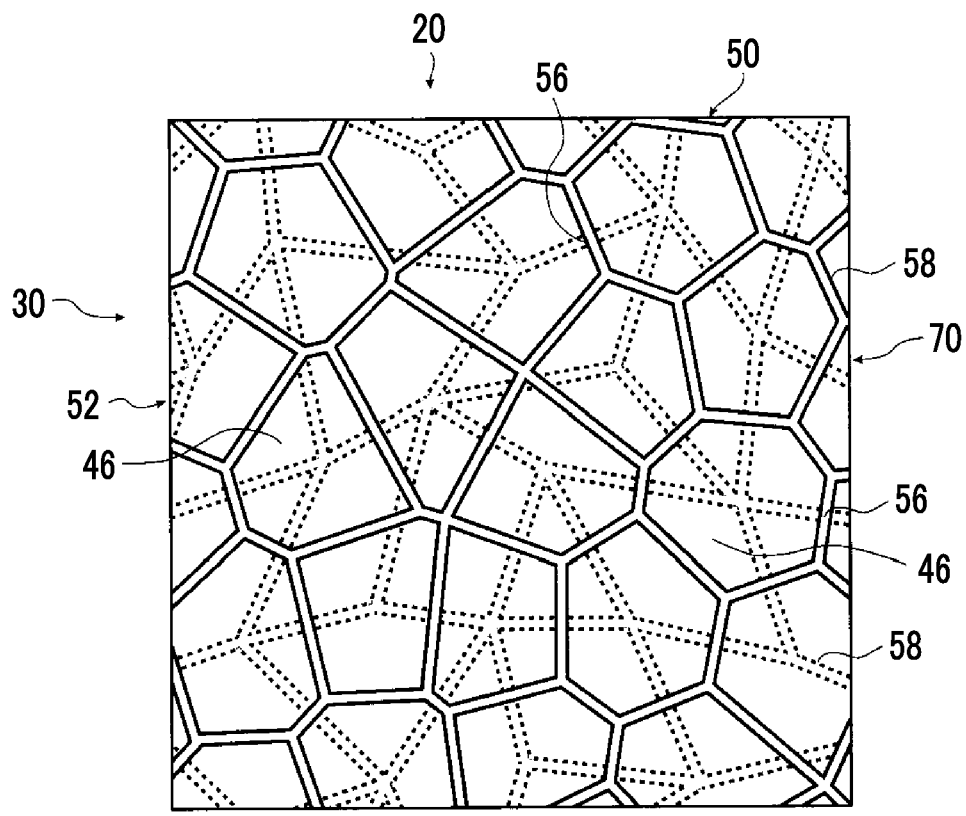
FIG. 19 is a plan view schematically showing an example of a state in which vicinity regions of thin metal wires of two electrode patterns are superimposed in an electrode crossing region of a conductive film used in Example 2.

For Example 2, a sensor portion of a touch panel sensor was configured by using a conductive film having a synthesized electrode pattern in which the first electrode pattern 50 of the first electrode 20 having an electrode width of 2 mm and the second electrode pattern 52 of the second electrode 30 having an electrode width of 2 mm were overlapped with the substrate 16 interposed therebetween so as to cross (be perpendicular to) each other in the electrode crossing region 70 as shown in FIG. 19 showing the electrode crossing region 70 in an enlarged manner. Here, both the first electrode pattern 50 and the second electrode pattern 52 were random electrode patterns with irregularity constituted by the random polygonal cells 46.

In FIG. 19, the thin metal wires themselves constituting the first electrode pattern 50 and the second electrode pattern 52 represent the vicinity region 58 of the thin metal wire of the first electrode pattern 50 having a line width four times wider than the line width of the thin metal wire as a virtual line indicating the vicinity region 58 of the thin metal wire and indicated by a solid line, and the vicinity region 58 of the thin metal wire of the second electrode pattern 52 having a line width four times wider than the line width of the thin metal wire and indicated by a broken line although not described.

In the sensor portion, a 5 mm×5 mm quadrangular region was set as an evaluation target region (not shown) so as to include the electrode crossing region 70 in which the first electrode 20 and the second electrode 30 were superimposed to cross each other.

In the electrode crossing region 70 in the target region, all of the overlapped portions (second overlapped portions) 56 in which the vicinity region 58 of the thin metal wires of the first electrode pattern 50 indicated by a solid line in FIG. 19 and the vicinity region 58 of the thin metal wires of the second electrode pattern 52 indicated by a broken line in FIG. 19 were overlapped were selected to obtain the number of the overlapped portions. The parameters Cb of all of the selected overlapped portions 56 were calculated to obtain the number of the overlapped portions. The percentage (proportion) of the obtained number of overlapped portions with respect to the total number of overlapped portions 56 was obtained. Further, the electrode crossing region 70 shown in FIG. 19 was visually observed to evaluate the occurrence of moire. In addition, the electrode crossing region 70 shown in FIG. 19 was touched with a finger from the operation side to evaluate responsiveness.

The total number of overlapped portions 56 in the electrode crossing region 70 shown in FIG. 19 was 40. All of the overlapped portions 56 were overlapped portions having a parameter Cb of 0.5 or less and having a parameter Ca of more than 0.5 in the crossing region 70.

The line widths wa and wb of the thin metal wires in Example 2 were both 5 μm (wa=wb=w=5 μm), the widths 4wa and 4wa of the vicinity regions 58 were both 20 μm (4wa=4wb=4w=20 μm), and a distance d between the thin metal wires of the first electrode pattern 50 and second electrode pattern 52 was 100 μm (d=100 μm).

The number of overlapped portions 56 obtained, the number of overlapped portions 56 in which the value of the parameter Cb was more than 0.5, the proportion of the overlapped portions 56 in which the value of the parameter Cb was more than 0.5 with respect to the total number of overlapped portions 56, the occurrence of moire, and the evaluation result of responsiveness are shown in Table 1.

Comparative Example 2

Figure 20:
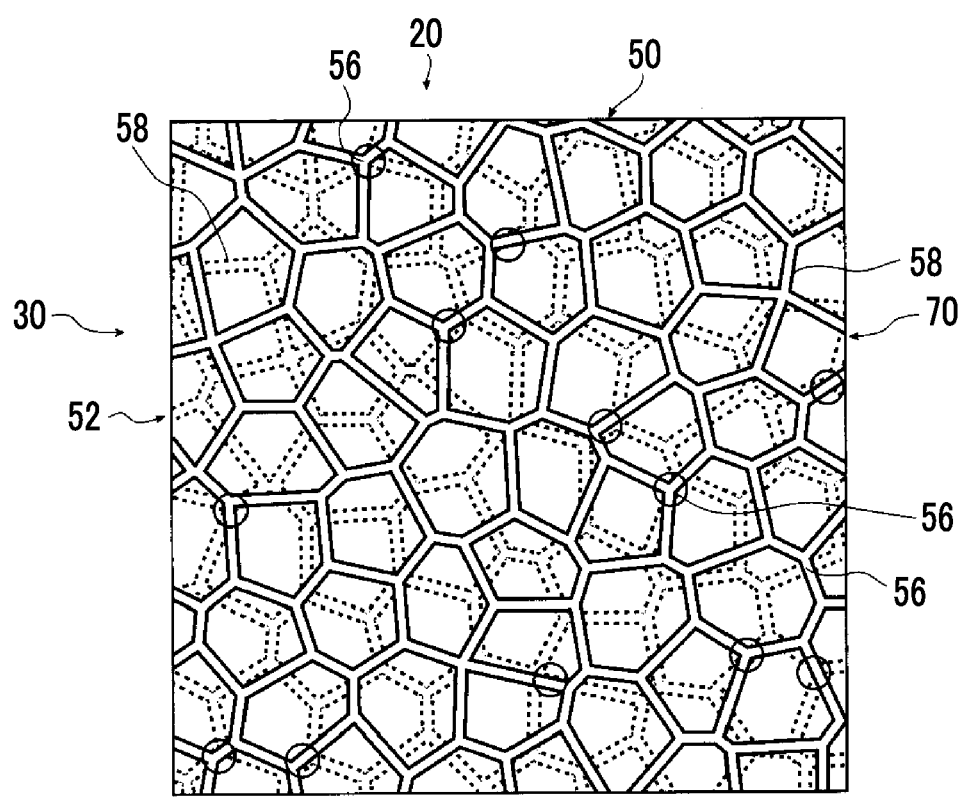
FIG. 20 is a plan view schematically showing a state in which vicinity regions of thin metal wires of two electrode patterns are superimposed in an electrode crossing region of a conductive film used in Comparative Example 2.

For Comparative Example 2, a sensor portion of a touch panel sensor was configured in the same manner as in Example 2 shown in FIG. 19 by using a conductive film having a synthesized electrode pattern of the first electrode pattern 50 of the first electrode 20 and the second electrode pattern 52 of the second electrode 30 except that a state in which the vicinity region 58 of the thin metal wires of the first electrode 20 and the vicinity region 58 of the thin metal wires of the second electrode 30 were overlapped was different as shown in FIG. 20, and a 5 mm×5 mm quadrangular region was set as an evaluation target region (not shown) so as to include the electrode crossing region 70 in which the first electrode 20 and the second electrode 30 were superimposed to cross each other.

In the electrode crossing region 70, as in Example 2, the number of overlapped portions (second overlapped portions) 56 in which the vicinity region 58 of the thin metal wires of the first electrode pattern 50 indicated by a solid line in FIG. 20 and the vicinity region 58 of the thin metal wires of the second electrode pattern 52 indicated by a broken line in FIG. 20 were overlapped were obtained and the parameters Cb of all of the overlapped portions 56 were calculated to obtain the number of overlapped portions. The percentage (proportion) of the obtained number of overlapped portions with respect to the total number of overlapped portions 56 was obtained. Further, as in Example 2, the occurrence of moire and responsiveness were evaluated.

The overlapped portion 56 indicated by a circle frame in FIG. 20 represented an overlapped portion 56 in which the parameter Cb was more than 0.5 and the number of the overlapped portions in the electrode crossing region 70 was 12. The total number of overlapped portions 56 in the electrode crossing region 70 was 98.

The line widths wa and wb of the thin metal wires in Comparative Example 2 were both 5 μm (wa=wb=w=5 μm), the widths 4wa and 4wa of the vicinity regions 58 were both 20 μm (4wa=4wb=4w=20 μm), and a distance d between the thin metal wires of the both electrode pattern 52 was 100 μm (d=100 μm).

The number of overlapped portions 56 obtained, the number of overlapped portions 56 in which the value of the parameter Ca was more than 1.0, the proportion of the overlapped portions 56 in which the value of the parameter Ca was more than 1.0 with respect to the total number of overlapped portions 56, the occurrence of moire, and the evaluation result of responsiveness are shown in Table 1.

TABLE 1

|  | Number of crossing portions | Ca > 1.0 | Cb > 0.5 | Proportion | Moire | Responsiveness |
|---|---|---|---|---|---|---|
| Example 1 | 132 | 7 |  | 5.3% | Not found | 4 |
| Example 2 | 40 |  | 0 | 0% | Not found | 5 |
| Comparative Example 1 | 27 | 3 |  | 11.1% | Not found | 2 |
| Comparative Example 2 | 98 |  | 12 | 12.2% | Not found | 2 |

In the examples, the evaluation on in-plane stability was replaced by the evaluation on responsiveness for evaluation.

The responsiveness does not directly indicate in-plane stability. However, when in-plane stability is deteriorated, position accuracy is deteriorated and as a result, linearity is deteriorated. Therefore, discriminability for a plurality of fingers is deteriorated and recognition in the vicinity region is deteriorated. As a result, follow-up performance for moving substances is deteriorated, that is, responsiveness is deteriorated. Therefore, in-plane stability is evaluated based on the evaluation on responsiveness.

Accordingly, from the results shown in Table 1, the followings can be mentioned.

In Comparative Example 1, the proportion of the crossing portion (first overlapped portion) 54 in which the parameter Ca is more than 1.0 is more than 10% and moire does not occur due to the use of the random pattern. However, in-plane stability is poor and responsiveness is grade 2, which is not good.

In Comparative Example 2, the proportion of the overlapped portion (second overlapped portion) 56 in which the parameter Cb is more than 0.5 is more than 10% and moire does not occur due to the use of the random pattern. However, in-plane stability is poor and responsiveness is grade 2, which is not good.

In Example 1, the proportion of the crossing portion (first overlapped portion) 54 in which the parameter Ca is more than 1.0 is 10% or less, that is, the percentage of the crossing portion (first overlapped portion) 54 in which the parameter Ca is 1.0 or less is 90% or more, and moire does not occur due to the use of the random pattern. In addition, in-plane stability is good and responsiveness is grade 4, which is good.

In Example 2, the proportion of the overlapped portion (second overlapped portion) 56 in which the parameter Cb is more than 0.5 is 10% or less, that is, the percentage of the overlapped portion (second overlapped portion) 56 in which the parameter Cb is 0.5 or less is 90% or more, and moire does not occur due to the use of the random pattern. In addition, in-plane stability is very good and responsiveness is grade 5, which is very good.

From the above description, the effects of the present invention become apparent.

EXPLANATION OF REFERENCES

10: Touch panel sensor
12, 12A: Conductive film

14: Controller
15: Flexible Printed Circuits (FPC)
16: Substrate
20: First electrode
22, 32: Terminal portion
24, 34: Lead-out wiring
30: Second electrode
40: Thin metal wire
41, 43, 47: Adhesive layer
42, 44: Protective layer
46: Cell (opening portion)
50: First electrode pattern
52: Second electrode pattern
54: first overlapped portion
56: second overlapped portion
58: Vicinity region
60, 64: Random electrode pattern
62: Regular electrode pattern
70: Electrode crossing region
72: Evaluation target region

What is claimed is:

1. A conductive film comprising:
a substrate which is a transparent insulator; and
a first electrode having a first electrode pattern and a second electrode having a second electrode pattern, which are respectively arranged to face the substrate and to cross or superimpose each other,
wherein the first electrode and the second electrode are respectively constituted of thin metal wires and are respectively electrically connected to each other,
the first electrode pattern and the second electrode pattern are respectively constituted by combining cells formed of the thin metal wires,
the cells constituting at least one of the first electrode pattern or the second electrode pattern are provided with irregularity, and
wherein a first overlapped portion, in which the thin metal wire constituting the first electrode and the thin metal wire constituting the second electrode are superimposed in plan view, corresponds to a parameter Ca which satisfies the equation:

$Ca=(A-wa*wb)/d,$ wherein A is an area of the first overlapped portion, wherein wa and wb are line widths of the respective thin metal wires constituting the first electrode and the second electrode, and d is a distance between the first electrode and the second electrode in a thickness direction of the substrate, in a 5 mm×5 mm quadrangular region that is set to include a crossing region in which the first electrode and the second electrode cross each other in a conductive region formed by the first electrode, the second electrode, and the substrate on which these electrodes are arranged, the parameter Ca of 90% or more first overlapped portions among all of the first overlapped portions included in the quadrangular region is 1.0 or less,
where the area A of the first overlapped portion is expressed by $\mu m^2$, the line widths wa and wb of the thin metal wires are expressed by $\mu m$, and the distance d between the first electrode and the second electrode is expressed by $\mu m$.

2. The conductive film according to claim 1,
wherein the first electrode and the second electrode are respectively formed on both surfaces of the substrate,
the first electrode pattern of the first electrode and the second electrode pattern of the second electrode are respectively arranged to face both sides of the substrate while interposing the substrate therebetween and to cross each other, and
the first overlapped portion is formed by superimposing the thin metal wire constituting the first electrode and the thin metal wire constituting the second electrode in plan view with the substrate interposed therebetween.

3. The conductive film according to claim 1, further comprising:
a second substrate which is different from the substrate and is a transparent insulator,
wherein the first electrode is formed on one surface of the substrate,
the second electrode is formed on one surface of the second substrate,
the substrate and the second substrate are caused to adhere to each other with an adhesive, and
the first overlapped portion is formed by superimposing the thin metal wire constituting the first electrode and the thin metal wire constituting the second electrode in plan view with the substrate interposed therebetween.

4. The conductive film according to claim 1,
wherein the first electrode and the second electrode are respectively formed on one side of the substrate with an insulating layer interposed therebetween,
the first electrode pattern of the first electrode and the second electrode pattern of the second electrode are respectively arranged to face both sides of the insulating layer while interposing the insulating layer therebetween and to cross each other, and
the first overlapped portion is formed by superimposing the thin metal wire constituting the first electrode and the thin metal wire constituting the second electrode in plan view with the insulating layer interposed therebetween.

5. The conductive film according to claim 1,
wherein the first overlapped portion includes a crossing portion in which the thin metal wire constituting the first electrode and the thin metal wire constituting the second electrode cross each other in plan view with the substrate or the insulating layer interposed therebetween, and a portion in which the two thin metal wires on both sides are superimposed in a width direction thereof.

6. The conductive film according to claim 2,
wherein the first overlapped portion includes a crossing portion in which the thin metal wire constituting the first electrode and the thin metal wire constituting the second electrode cross each other in plan view with the substrate or the insulating layer interposed therebetween, and a portion in which the two thin metal wires on both sides are superimposed in a width direction thereof.

7. The conductive film according to claim 3,
wherein the first overlapped portion includes a crossing portion in which the thin metal wire constituting the first electrode and the thin metal wire constituting the second electrode cross each other in plan view with the substrate or the insulating layer interposed therebetween, and a portion in which the two thin metal wires on both sides are superimposed in a width direction thereof.

8. The conductive film according to claim 4,
wherein the first overlapped portion includes a crossing portion in which the thin metal wire constituting the first electrode and the thin metal wire constituting the second electrode cross each other in plan view with the substrate or the insulating layer interposed therebetween, and a portion in which the two thin metal wires on both sides are superimposed in a width direction thereof.

9. The conductive film according to claim 1,
wherein the distance d between the first electrode and the second electrode is 100 µm or less.

10. The conductive film according to claim 1,
wherein the line widths wa and wb of the thin metal wires are 0.5 µm to 10 µm.

11. The conductive film according to claim 1,
wherein the line widths wa and wb of the thin metal wires are equal to each other.

12. A touch panel sensor comprising:
the conductive film according to claim 1; and
a detection control portion that detects a touch position or approach position from a main surface side of the conductive film.

13. The touch panel sensor according to claim 12,
wherein the conductive film may be touched with a stylus pen from the main surface side.

14. A conductive film comprising:
a substrate which is a transparent insulator; and
a first electrode having a first electrode pattern and a second electrode having a second electrode pattern, which are respectively arranged to face the substrate and to cross or superimpose each other,
wherein the first electrode and the second electrode are respectively constituted of thin metal wires and are respectively electrically connected to each other,
the first electrode pattern and the second electrode pattern are respectively constituted by combining cells formed of the thin metal wires,
the cells constituting at least one of the first electrode pattern or the second electrode pattern are provided with irregularity, and
both side regions formed along a center line in a range of four times of a width W of the thin metal wire from the center line in a width direction of the thin metal wires are set to vicinity regions, wherein a second overlapped portion, in which the vicinity region of the thin metal wire constituting the first electrode and the vicinity region of the thin metal wire constituting the second electrode are superimposed in plan view, corresponds to a parameter Cb which satisfies the equation:

$Cb=(B/16-wa*wb)/d,$ wherein B is an area of the second overlapped portion, wherein wa and wb are line widths of the thin metal wires respectively constituting the first electrode and the second electrode, and d is a distance between the first electrode and the second electrode in a thickness direction of the substrate, in a 5 mm×5 mm quadrangular region that is set to include a crossing region in which the first electrode and the second electrode cross each other in a conductive region formed by the first electrode, the second electrode, and the substrate on which these electrodes are arranged, the parameter Cb of 90% or more second overlapped portions among all of the second overlapped portions included in the quadrangular region is 0.5 or less,
where the area B of the second overlapped portion is expressed by µm², the line widths wa and wb of the thin metal wires are expressed by µm, and the distance d between the first electrode and the second electrode is expressed by µm.

15. The conductive film according to claim 14,
wherein the first electrode and the second electrode are respectively formed on both surfaces of the substrate,
the first electrode pattern of the first electrode and the second electrode pattern of the second electrode are respectively arranged to face both sides of the substrate while interposing the substrate therebetween and to cross each other, and
the second overlapped portion is formed by superimposing the vicinity region of the thin metal wire constituting the first electrode and the vicinity region of the thin metal wire constituting the second electrode in plan view with the substrate interposed therebetween.

16. The conductive film according to claim 14, further comprising:
a second substrate which is different from the substrate and is a transparent insulator,
wherein the first electrode is formed on one surface of the substrate,
the second electrode is formed on one surface of the second substrate,
the substrate and the second substrate are caused to adhere to each other with an adhesive, and
the second overlapped portion is formed by superimposing the vicinity region of the thin metal wire constituting the first electrode and the vicinity region of the thin metal wire constituting the second electrode in plan view with the substrate interposed therebetween.

17. The conductive film according to claim 14,
wherein the first electrode and the second electrode are respectively formed on one side of the substrate with an insulating layer interposed therebetween,
the first electrode pattern of the first electrode and the second electrode pattern of the second electrode are respectively arranged to face both sides of the insulating layer while interposing the insulating layer therebetween and to cross each other, and
the second overlapped portion is formed by superimposing the vicinity region of the thin metal wire constituting the first electrode and the vicinity region of the thin metal wire constituting the second electrode in plan view with the insulating layer interposed therebetween.

18. The conductive film according to claim 14,
wherein the second overlapped portion includes a crossing portion in which the vicinity region of the thin metal wire constituting the first electrode and the vicinity region of the thin metal wire constituting the second electrode cross each other in plan view with the substrate or the insulating layer interposed therebetween and a portion in which the two vicinity regions of the thin metal wires on both sides are superimposed in a width direction thereof.

19. The conductive film according to claim 15,
wherein the second overlapped portion includes a crossing portion in which the vicinity region of the thin metal wire constituting the first electrode and the vicinity region of the thin metal wire constituting the second electrode cross each other in plan view with the substrate or the insulating layer interposed therebetween and a portion in which the two vicinity regions of the thin metal wires on both sides are superimposed in a width direction thereof.

20. The conductive film according to claim 16,
wherein the second overlapped portion includes a crossing portion in which the vicinity region of the thin metal wire constituting the first electrode and the vicinity region of the thin metal wire constituting the second electrode cross each other in plan view with the substrate or the insulating layer interposed therebetween and a portion in which the two vicinity regions of the thin metal wires on both sides are superimposed in a width direction thereof.

* * * * *